(12) United States Patent
Takeyama

(10) Patent No.: US 6,710,902 B2
(45) Date of Patent: Mar. 23, 2004

(54) OBSERVATION OPTICAL SYSTEM

(75) Inventor: Tetsuhide Takeyama, Hachioji (JP)

(73) Assignee: Olympus Corporation, Tokyo (JP)

( * ) Notice: Subject to any disclaimer, the term of this patent is extended or adjusted under 35 U.S.C. 154(b) by 50 days.

(21) Appl. No.: 10/120,832

(22) Filed: Apr. 12, 2002

(65) Prior Publication Data

US 2003/0086135 A1 May 8, 2003

(30) Foreign Application Priority Data

Apr. 13, 2001 (JP) ........................................ 2001-115970

(51) Int. Cl.[7] ................................................. G03H 1/00
(52) U.S. Cl. ............................ 359/13; 359/15; 359/16; 359/32; 359/630; 359/631; 345/8
(58) Field of Search ................. 359/13–15, 16, 359/19, 32, 629–632; 345/7–8; 250/216

(56) References Cited

U.S. PATENT DOCUMENTS

| | | |
|---|---|---|
| 4,309,070 A | 1/1982 | St. Leger Searle |
| 4,613,200 A | 9/1986 | Hartman |
| 4,711,512 A | 12/1987 | Upatnieks |
| 5,880,888 A | 3/1999 | Schoenmakers et al. |
| 5,966,223 A | 10/1999 | Friesem et al. |
| 2003/0020006 A1 * | 1/2003 | Janeczko et al. ........... 250/216 |

FOREIGN PATENT DOCUMENTS

| | | |
|---|---|---|
| JP | 02-297516 | 12/1990 |
| JP | 05-077658 | 3/1993 |
| JP | 05-178120 | 7/1993 |
| JP | 06-294943 | 10/1994 |
| JP | 07-134266 | 5/1995 |
| JP | 07-218859 | 8/1995 |
| JP | 08-113059 | 5/1996 |
| WO | WO 00/28369 | 5/2000 |

* cited by examiner

*Primary Examiner*—Drew A. Dunn
*Assistant Examiner*—Fayez Assaf
(74) *Attorney, Agent, or Firm*—Pillsbury Winthrop LLP

(57) ABSTRACT

An observation optical system includes an image display element, a relay optical system having a plurality of lenses 4 and a first reflection-type volume hologram element (HOE), and an eyepiece optical system having a second reflection-type HOE. The observation optical system is arranged along the face to the side head of the observer. The first reflection-type HOE has a power and is configured to compensate for chromatic aberrations. The plurality of lenses is configured to compensate for decentered aberrations and chromatic aberrations. The second reflection-type HOE is a configured to exert power on bundles of rays and to compensate for chromatic aberrations. A light-transmitting plate is sandwiched between the first reflection-type HOE and the second refection-type HOE.

15 Claims, 17 Drawing Sheets

FIG.16A
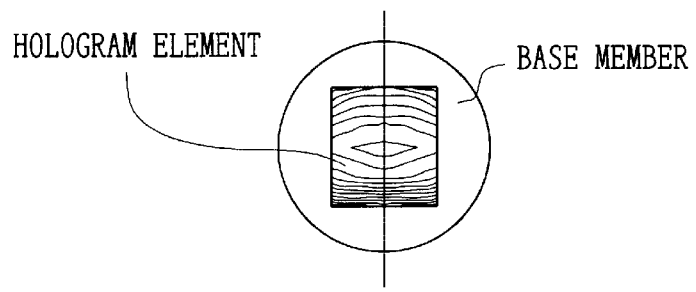
FIG.16B        FIG.16C        FIG.16D
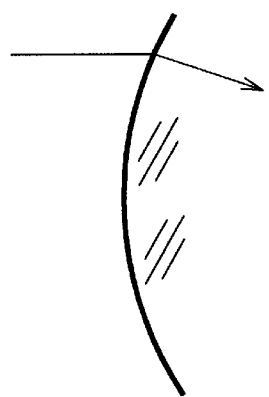    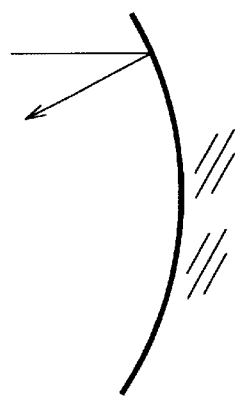    
$\Phi = (n-1)/R$      $\Phi = 2/R$       $\Phi = 2n/R$
REFRACTING SURFACE    FRONT-SURFACE MIRROR    BACK-SURFACE MIRROR (EXAMPLE) WHERE MEDIUM IS AIR WITH n=1:
$$\Phi_0^{2P} = -r_2 - r_1 < 0$$

OBSERVATION OPTICAL SYSTEM

BACKGROUND OF THE INVENTION

1) Field of the Invention

The present invention relates to an observation optical system. To be specific, it relates to an observation optical system used in an image display apparatus that can be held on the head or face of an observer and that can be attached to a cellular phone or a portable intelligent terminal.

2) Description of Related Art

In recent years, development has been energetically made for image display apparatuses, specifically for those to be held on the head or face of individuals for entertaining them with a wide-screen image.

Regarding the conventional observation optical systems applicable to such apparatuses, each of U.S. Pat. No. 4,613,200, International Application No. PCT/US99/26756 (Publication No. WO 00/28369), Japanese Patent Application Preliminary Publication (KOKAI) No. Hei 5-178120, Japanese Patent Application Preliminary Publication (KOKAI) No. Hei 5-077658 etc. proposes an image display optical system that achieves compensation for chromatic aberrations by combining two reflection-type volume hologram elements together.

Also, each of U.S. Pat. No. 4,309,070, U.S. Pat. No. 4,711,512, U.S. Pat. No. 5,966,223, Japanese Patent Application Preliminary Publication (KOKAI) No. Hei 8-113059 etc. proposes an image display optical system that includes a combination of a volume hologram element and a light-transmitting plate.

Also, each of Japanese Patent Application Preliminary Publication (KOKAI) No Hei 6-294943, Japanese Patent Application Preliminary Publication (KOKAI) No. Hei 7-134266, Japanese Patent Application Preliminary Publication (KOKAI) No. Hei 7-218859 etc. proposes an image display optical system that includes a relay optical system and a combiner.

Also, each of Japanese Patent Application Preliminary Publication (KOKAI) No. Hei 2-297516, U.S. Pat. No. 5,880,888 etc. proposes an image display optical system that has a relay and uses a light-transmitting plate.

However, an optical system as recited in U.S. Pat. No. 4,613,200, JP KOKAI No. 5-178120 or JP KOKAI No. 5-077658 becomes thick in the direction of line of sight, which is a problem. In reference to FIG. 1 of U.S. Pat. No. 4,613,200, for instance, this is because the optical system is configured to provide a reflection-type volume hologram element on an entrance surface of a tilting windshield (combiner) of an automobile for the purpose of deflecting incident light, which comes from a direction substantially perpendicular to the line of sight, in a direction along the line of sight.

Also, the optical system disclosed in WO 00/23869 is configured so that, as shown in FIG. 22 of the document, a reflection-type volume hologram element is disposed in the path of rays for image display and deflects the path, and that a transmission-type volume hologram also is incorporated so that chromatic aberrations cancel out. However, such a configuration with a reflection-type hologram element and a transmission-type hologram element requires a large reflecting diffraction angle at the combiner so as to guide the light reflected from the combiner by diffraction in a path that avoids the face of an observer. Consequently, a large power derived from diffraction effect of the reflection-type volume hologram element is needed at the combiner, and thus a problem is raised in that producing such a hologram having high-density interference fringes is difficult.

Also, in an optical system as disclosed in U.S. Pat. No. 4,309,070, U.S. Pat. No. 4,711,512, U.S. Pat. No. 5,966,223, KOKAI No. 8-113059 or the like, a combination of a volume hologram element and a light-transmitting plate forms a path of rays, to achieve thin shape of the optical system. However, no consideration is made for laying out the entire observation optical system along the face of an observer, to cause bulkiness of the entire observation optical system, which is a problem.

Also, in an optical system as disclosed in JP KOKAI No. 6-294943, JP KOKAI No. 7-134266, JP KOKAI No. 7-218859 or the like, a reflecting surface is used only at one portion of the combiner and thus the relay optical system cannot be laid out along the face of an observer, which is a problem.

Also, in an optical system as disclosed in JP KOKAI No. 2-297516, U.S. Pat. No. 5,880,888 or the like, no particular means or configuration is proposed for compensation for chromatic aberrations and decentered aberrations.

SUMMARY OF THE INVENTION

Therefore, an object of the present invention is to provide an observation optical system that is so compact and light-weight as to be applicable to a head-mount-type virtual image observation apparatus, provides a bright image with high resolution, and is easily assembled.

An observation optical system according to the present invention comprises an image display element, a relay optical system which relays image information formed on the image display element, and an eyepiece optical system which introduces the image information relayed by the relay optical system into the eye of an observer. The relay optical system includes, at least, a plurality of lenses and a first reflection-type volume hologram element. The first reflection-type volume hologram element is constructed and arranged to have a power and to compensate for chromatic aberrations. The plurality of lenses are constructed and arranged to compensate, at least, for decentered aberrations and chromatic aberrations. The eyepiece optical system has a second reflection-type volume hologram element, which is constructed and arranged to reflect bundles of rays toward the eye of the observer, to exert a power on the bundles of rays, and to compensate for chromatic aberrations. A light-transmitting plate is sandwiched between the first reflection-type volume hologram element and the second reflection-type volume hologram element, is filled with a transparent medium, and is constructed and arranged to lead the bundles of rays, which are reflected at least by the first reflection-type volume hologram element, to the second reflection-type volume hologram element by letting the bundles of rays cause, in the path, total reflection odd-numbered times equal to or greater than three times. The light-transmitting plate allows the relay optical system and the image display element to be arranged along the face to the side head of the observer.

This and other objects as well as the features and advantages of the present invention will become apparent from the following detailed description of the preferred embodiments when taken in conjunction with the accompanying drawings.

BRIEF DESCRIPTION OF THE DRAWINGS

FIGS. 16A–16D are views to explain two kinds of powers generated in the case where a hologram element is applied to a base member having a spherical shape. Specifically, FIG. 16A is a front view to show distribution of power caused by diffraction effect of the hologram element, and FIGS. 16B–16D are side views to show power caused by geometric shape in respective cases where the base member has a refracting surface, where the base member has a front-surface mirror, and where the base member has a back-surface mirror.

DETAILED DESCRIPTION OF THE PREFERRED EMBODIMENTS

Figure 1:
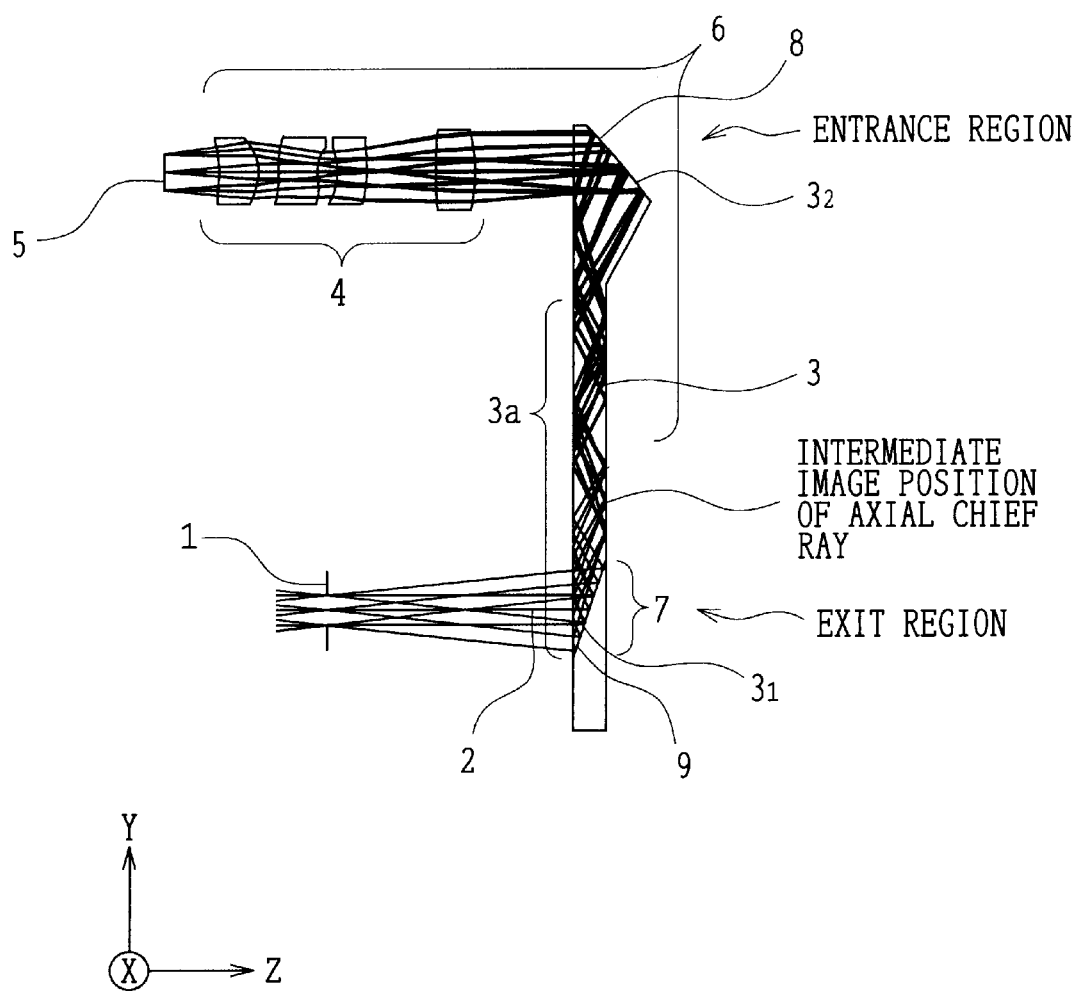
FIG. 1 is a sectional view of an observation optical system according to the first embodiment of the present invention taken along Y-Z plane in which the optical axis lies.

Now, description will be made of the modes for carrying out the present invention in reference to the embodiments shown in the drawings.

First, the principle of the present invention is explained in reference to the drawings.

As shown in FIG. 1, the observation optical system according to the present invention is configured to include an image display element 5, a plurality of lenses 4, and a light-transmitting plate 3. According to the present invention, an axial chief ray 2 is defined as a ray travelling from the center (i. e. the rotation center of an eyeball of an observer) of an exit pupil 1 to the center of the image display element 5 via the light-transmitting plate 3 and the plurality of lenses 4. The optical axis, which is defined by the straight line portion of the axial chief ray 2 from the exit pupil 1 to the intersection with the exit pupil-side surface of the light-transmitting plate 3, is defined as Z axis. The axis that intersects Z axis at right angles and that extends in the longitudinal direction of the light-transmitting plate 3 is defined as Y axis. The axis that intersects X axis and Y axis at right angles is defined as X axis. A direction of the axial chief ray 2 from the exit pupil 1 toward the image display element 5 is defined as a positive direction of Z axis. A direction of Y axis that is toward the image display element 5 is defined as a positive direction of Y axis. A direction of X axis that forms a right-hand system along with Y axis and Z axis is defined as a positive direction of X axis.

Optical components arranged in a space from the plurality of lenses 4 and an intermediate image position of the light-transmitting plate 3 constitute a relay optical system 6 for relaying image information formed by the image display element 5. The relay optical system 6 is designed to form an intermediate image at a predetermined position inside the light-transmitting plate 3. Also, the exit pupil-side section of the light-transmitting plate 7 constitutes an eyepiece optical system 7. The eyepiece optical system 7 is designed to introduce the image information relayed by the relay optical system 6 to the eye of the observer.

Also, these optical components constituting the observation optical system according to the present invention are arranged so that the path of rays from the exit pupil 1 through the image display element 5 is formed along the face to the side head of the observer (in the example of FIG. 1, "Π"-shape arrangement).

The light-transmitting plate 3 is formed out of transparent glass or transparent plastic, to substantially have a thin-plate shape over its entirety. Base surfaces $3_1$, $3_2$ are arranged on the far side surfaces from the observer in an entrance region and an exit region. A first reflection-type volume hologram element (HOE) 8 is formed on the base surface $3_2$ and a second reflection-type volume hologram element (HOE) 9 is formed on the base surface $3_1$.

The base surface $3_2$ is formed to tilt like a roof rising toward the far side from the observer in reference to the thin-plate section 3a so that light entering the light-transmitting plate 3 via the image display element 5 and the plurality of lenses 4 and then reflected by diffraction at the first reflection-type HOE 8 easily causes total reflection, in the thin-plate section 3a, on the interface with the outside.

The base surface $3_1$ is formed to tilt in reference to the thin-plate section 3a so that the light causing total reflection on the interface in the thin-plate section 3a and then reflected by diffraction at the second reflection-type HOE 9 is easily transmitted through the thin-plate section 3a.

The base surfaces $3_1$, $3_2$, on which the first and second reflection-type HOEs 8, 9 are provided, are thus arranged. This is because base surfaces arranged parallel with the thin-plate section 3a would require HOEs to have a large power resulting from diffraction effect and accordingly to have a small pitch of interference fringes. Such a HOE is difficult to fabricate, and, in addition, would generate large amount of chromatic aberrations at the HOE surface.

A hologram element has two kinds of powers, i. e. an optical power resulting from the geometric shape and an optical power resulting from the diffraction effect of the hologram element. In reference to the drawings, explanation is made of these two kinds of powers in the case where a hologram element is formed on a base member having a spherical shape, for example. As shown in FIG. 16A, a hologram element has a power resulting from variety of interference fringe density such as the pitch of a grating structure in the hologram element. Also, as shown in FIGS. 16B–16D, a hologram element has an optical power resulting from its geometric shape. The optical power resulting from the geometric shape of a hologram element is calculated by the following equations (1)–(3) similar to the power of a conventional optical refracting lens or reflecting mirror:

refracting system:

$$\Phi = (n-1)(1/R) \quad (1)$$

front-surface mirror:

$$\Phi = 2/R \quad (2)$$

back-surface mirror:

$$\Phi = 2n/R \quad (3)$$

where $\Phi$ is the optical power resulting from the geometric shape of the hologram element, n is the refractive index of medium, and R is the radius of curvature of the hologram base member.

Thus, comparison between the front-surface mirror and the back-surface mirror leads to the conclusion that, for obtaining a predetermined optical power resulting from the geometric shape, a back-surface mirror is allowed to have a moderate curvature, or 1/n of the curvature required for a front-surface mirror. In other words, the radius of curvature of the back-surface mirror is n times that of the front-surface mirror having the same power.

In a configuration similar to a back-surface mirror where the inside of a reflection-type hologram element is filled with a medium such as glass or plastic having a refractive index n, a large optical power is obtained by the geometric shape in spite of a large radius of curvature R of the reflecting surface. In this manner, we can suppress aberrations generated at a hologram surface by applying the structure that generates a large optical power with a large radius of curvature R to the optical system.

Therefore, according to the present invention, a light-transmitting plate filled with a transparent medium intervenes between the first reflection-type HOE 8 and the second reflection-type HOE 9, to form the above-mentioned structure similar to a back-surface mirror, so that a large optical power is obtained while aberrations generated at the hologram surfaces are suppressed.

Also, the thin-plate section 3*a* of the light-transmitting plate 3 has a sufficient length to allow the bundles of rays reflected by the first reflection-type HOE 8 to cause total reflection odd-numbered times equal to or greater than three times before they reach the second reflection-type HOE 9.

If the configuration is made so that total reflection is caused even-numbered times before the bundles of rays reach the second reflection-type HOE 9, the first reflection-type HOE 8 and the second reflection-type HOE 9 have to be disposed on opposite side surfaces with the light-transmitting plate 3 between. Consequently, the exit pupil surface and the display surface should fail to be disposed on the same side in reference to the light-transmitting plate 3 and thus optical components constituting the observation optical system could not be arranged along the face to the side head of the observer.

Also, the configuration in which total reflection is caused at least three times is employed so as to guide light for a distance corresponding to a path along the side head of the observer to the eye of the observer.

Also, according to the present invention, volume holograms are used by the following reasons.

Regarding the hologram element, there are two types; i. e. a relief hologram and a volume hologram. The relief hologram has the property of low selectivity regarding incident angle and low selectivity regarding wavelength. Thus, such a type of hologram diffracts rays with a particular wavelength incident thereon at a particular angle and images them as desired diffraction order rays, while diffracting, at a low diffraction efficiency, other rays with different wavelengths incident thereon at different angles and imaging them as undesired order rays. In contrast, the volume hologram has the property of high selectivity with respect to incident angle and high selectivity with respect to wavelength. Thus, such a type of hologram exclusively diffracts rays with a particular wavelength incident thereon at a particular angle, while transmitting the remaining rays as 0th order rays so that undesired order rays should hardly be imaged.

Therefore, if, as in the present invention, a reflection-type volume hologram is used as a hologram element provided for a light-transmitting plate 3, image blur because of undesired order rays is obviated, and thus a clear image can be provided for observation.

Figure 17:
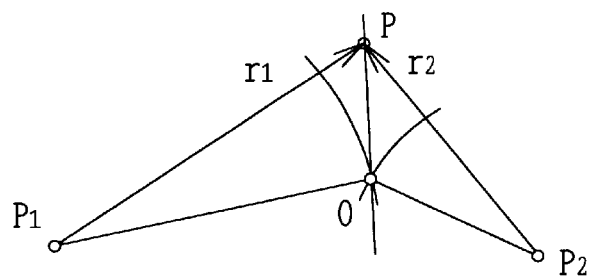
FIG. 17 is a view to show the principle of defining HOE according to the present invention.

The volume hologram used as a hologram element (HOE) in the present invention is defined as follows. FIG. 17 is a view to show the principle of defining HOE according to the present invention.

Ray tracing for a ray with wavelength $\lambda$ incident on and emergent from the HOE surface is given by the following equation (4), which uses the optical path difference function $\Phi_0$ defined for a reference wavelength $\lambda_0$=HWL on the HOE surface:

$$n_d Q_d \cdot N = n_1 Q_1 \cdot N + m(\lambda/\lambda_0) \nabla \Phi_0 \cdot N \quad (4)$$

where N is a vector of the normal to the HOE surface, $n_i$ ($n_d$) is a refractive index on the incident side (emergent side), $Q_i$ ($Q_d$) is a vector of incidence (emergence), and m=HOR is a diffraction order of emergent light.

If the HOE is fabricated (defined) by two point light sources with the reference wavelength $\lambda_0$, specifically by interference between object rays emanating from the point $P_1$=(HY1, HY2, HY3) and reference rays emanating from the point $P_2$=(HX2, HY2, HZ2) as shown in FIG. 17, the following equation is satisfied:

$$\Phi_0 = \Phi_0^{2P}$$

$$= n_2 \cdot s_2 \cdot r_2 - n_1 \cdot s_1 \cdot r_1$$

where $r_1$ ($r_2$) is a distance (>0) from the point $P_1$ ($P_2$) to a predetermined coordinate point on the HOE, $n_1$ ($n_2$) is a refractive index of the point $P_1$ ($P_2$) -side medium by which the HOE was arranged during fabrication (definition), $s_1$=HV1, and $s_2$=HV2 are signs to take into consideration the travelling direction of light. In the case where the light source is a divergent light source (real point source), the sign is set to be REA=+1, while in the case where the light source is a convergent light source (virtual point light source), the sign is set to be VIR=−1. It is noted that in defining a HOE in lens data, the refractive index $n_1$ ($n_2$) of the medium in which the HOE was arranged during fabrication is the refractive index of the medium that is adjacent to the HOE on the side of the point $P_1$ ($P_2$).

In general cases, reference rays and object rays used to fabricate a HOE are not limited to spherical waves. In these cases, the optical path difference function $\Phi_0$ of HOE can be defined by the following equation (5) in which an additional phase term $\Phi_0^{Poly}$ (optical path difference function for the reference wavelength $\lambda_0$) expressed by polynomial terms is added:

$$\Phi_0 = \Phi_0^{2P} + \Phi_0^{Poly} \quad (5)$$

The polynomial $\Phi_0^{Poly}$ is given by:

$$\Phi_0^{Poly} = \sum_j H_j \cdot x^m \cdot y^n$$

$$= H_1 x + H_2 y + H_3 x^2 + H_4 xy + H_5 y^2 + H_6 x^3 +$$

$$H_7 x^2 y + H_8 xy^2 + H_9 y^3 + \ldots$$

and can be defined, in general, by:

$$j = \{(m+n)^2 + m + 3n\}/2$$

where $H_j$ is the coefficient of each term.

Furthermore, for convenience in optical designing, the optical path difference function $\Phi_0$ may be expressed only by the additional term as follows:

$$\Phi_0 = \Phi_0^{Poly}$$

whereby the HOE can be defined. For example, if the two point light sources $P_1$ and $P_2$ coincide, the component $\Phi_0^{2P}$ of the optical path difference function $\Phi_0$ derived from interference becomes zero. This condition corresponds to the case where the optical path difference function is expressed only by the additional terms (polynomial expression).

The above descriptions regarding HOE are made in reference to a local coordinate system determined by the HOE origin.

An example of the parameter set to define the HOE is shown below:

| Surface Arrangement No. | Radius of Curvature | Separation |
|---|---|---|
| object surface | ∞ | ∞ |
| stop | ∞ | 100 |
| 2 | 150 | −75 |

HOE:
HV1 ($s_1$)=REA (+1)

HV2 ($s_2$)=VIR (−1)

HOR (m)=1

HX1=0, HY1=−3.40×10$^9$, HZ1=−3.40×10$^9$
HX2=0, HY2=2.50×10, HZ2=−7.04×10
HWL ($\lambda_0$)=544
$H_1$=−1.39×10$^{-21}$ $H_2$=−8.57×10$^{-5}$ $H_3$=−1.50×10$^{-4}$ Next, regarding chief rays incident on the light-transmitting plate, description is made of reflection caused inside the light-transmitting plate in the observation optical system according to the present invention, using a ray perpendicularly incident on the light-transmitting plate.

A ray that is perpendicularly incident on the observer's side surface in the entrance region of the light-transmitting plate 3 is transmitted there and then is incident on the first reflection-type HOE 8 formed on the base surface $3_2$. The first reflection-type HOE 8 is configured to have an angular selectivity to reflect by diffraction a ray incident on the base surface $3_2$ at a first incident angle, and reflects the incident ray by diffraction. The ray reflected by diffraction at the first reflection-type HOE 8 repeats, on the glass or plastic interfaces on both sides of the thin-plate section 3a, total reflection odd-numbered times equal to or greater than three times with an incident angle greater than the critical angle, and is incident on the second reflection-type HOE 9 formed on the base surface $3_1$ in the exit region.

The second reflection-type HOE 9 is configured to have an angular selectivity to reflect by diffraction a ray incident on the base surface $3_1$ at a second incident angle, and reflects the incident ray by diffraction. The ray reflected by diffraction at the second reflection-type HOE 9 exits out of the light-transmitting plate 3 via the observer's side surface in the exit region as incident thereon at an incident angle smaller than the critical angle (in the case of FIG. 1, perpendicular to the surface, or at the incident angle of 0°).

It is generally known that a diffraction optical element having a large diffraction angle has a fine pitch of grating structure in the element and is difficult to fabricate.

In the observation optical system according to the present invention, since HOEs are disposed in the entrance region and the exit region, respectively, the diffraction angle for each HOE can be designed not to be large and thus the pitch of interference fringes in each HOE is allowed to be wide.

The light-transmitting plate 3 shown in FIG. 1 is configured to be a decentered optical system, and is provided with hologram elements so that incident light is guided to a predetermined position by means of total reflection and exits therefrom to be observed. Thus, the light-transmitting plate itself would generate a large amount of decentered aberrations. Therefore, according to the present invention, it is preferred that a plurality of lenses 4 outside the light transmitting plate are formed as free curved surface lenses each having at least one free curved surface so as to compensate for decentered aberrations generated via the light-transmitting plate 3 and chromatic aberrations generated via the hologram elements. In addition, where the plurality of lenses 4 are constructed of free curved surface lenses, these lenses can be easily arranged along the side head of the observer for compensation of these aberrations.

Also, the observation optical system according to the present invention is configured to include a relay optical system, which causes bundles of rays entering the optical system to be formed as an intermediate image at a position between the entrance region and the exit region of the light-transmitting plate. In this configuration, aberrations generated in the optical section on the eyepiece side can be compensated for by the optical section on the image display element side of the intermediate image position. Furthermore, since the small image display element is projected on the intermediate image plane as a large image, it is optically equivalent to the configuration in which a large image display element is used with an eyepiece optical system. Consequently, a wide observation field angle is obtained even if a small image display element is used.

On the other hand, if, as in the conventional optical system, an image display system is constructed of an eyepiece optical system alone without forming a relay optical system, the eyepiece optical system is required to have a higher power, or to have a shorter focal length with increased magnification, so as to achieve wide observation field angle. However, if the power of the eyepiece optical system is too high, aberration performance is degraded.

Therefore, the configuration including a relay optical system as employed in the observation optical system of the present invention is effective for the purpose of obviating these problems.

As discussed above, the optical system of the present invention shown in FIG. 1 is constructed and arranged so that bundles of rays entering the light-transmitting plate 3 via the image display element through the plurality of lenses 4 are reflected by diffraction at the first reflection-type HOE arranged in the entrance region, then cause total reflection odd-numbered times equal to or greater than three times to be introduced to the exit region while being formed as an image at the intermediate image position inside the light-transmitting plate 3, then are reflected by diffraction at the second reflection-type HOE 9 arranged in the exit region, and exit out of the exit region, to be imaged at the exit pupil 1.

Also, in the observation optical system according to the present invention thus configured, it is important to satisfy the following condition (6) or (7) for the purpose of arranging the path of rays in "Π"-shape to allow the relay optical system and the image display element to be laid out along the face to the side head of the observer, while controlling the chromatic aberrations generated at the first and second reflection-type volume hologram elements to cancel:

$$0.5 < (OP1/OP2)/(H2\_S4/H2\_S10) < 4.0 \quad (6)$$

$$-3.5 < (\theta\_S10)/\theta\_S4) < -1.0 \quad (7)$$

where OP1 is an optical path length, in millimeters, measured along a chief ray in an axial field angle (i. e. "axial chief ray" defined above) from the intermediate image to the first reflection-type volume hologram element, OP2 is an optical path length, in millimeters, measured along the chief ray in the axial field angle from the second reflection-type volume hologram element to the intermediate image, H2_S10 is a coefficient of a Y-direction, first-order component of an optical path difference function at the first reflection-type volume hologram element, H2_S4 is a coefficient of a Y-direction, first-order component of an optical path difference function at the second reflection-type volume hologram element, θ_S10 is a tilt angle, in degrees, of the first reflection-type volume hologram element, and θ_S4 is a tilt angle, in degrees, of the second reflection-type volume hologram element.

A tilt angle θ in general of a volume hologram element appearing in Condition (7) is calculated by:

$$\theta = \tan^{-1}\{(\tan \alpha)^2 + (\tan \beta)^2\}^{1/2}$$

where α is a tilt angle, in degrees, in reference to X axis and β is a tilt angle, in degrees, in reference to Y axis.

If a value of (OP1/OP2)/(H2_S4/H2_S10) falls below the lower limit of Condition (6), Y-direction, first-order chromatic aberration generated at the second reflection-type volume hologram element becomes too large for the optical path length from the intermediate image to the first reflection-type volume hologram element, and, in addition, amount of compensation for Y-direction, first-order chromatic aberration generated at the first reflection-type volume hologram element becomes too small for the optical path length from the second reflection-type volume hologram element to the intermediate image. Therefore, chromatic aberrations generated at the first and second reflection-type volume hologram elements cannot cancel out. As a result, the optical system is not capable of providing for an observer a high-contrast image with chromatic aberrations been compensated for.

On the other hand, if a value of (OP1/OP2)/(H2_S4/H2_S10) exceeds the upper limit of Condition (6), Y-direction, first-order chromatic aberration generated at the second reflection-type volume hologram element becomes too small for the optical path length from the intermediate image to the first reflection-type volume hologram element, and, in addition, amount of compensation for Y-direction, first-order chromatic aberration generated at the first reflection-type volume hologram element becomes too large for the optical path length from the second reflection-type volume hologram element to the intermediate image. Therefore, chromatic aberrations generated at the first and second reflection-type volume hologram elements cannot cancel out. As a result, the optical system is not capable of providing for an observer a high-contrast image with chromatic aberrations been compensated for.

Also, if a value of (θ_S10/θ_S4) exceeds the upper limit of Condition (7), the reflecting diffraction angle at the first reflection-type volume hologram element becomes too large upon the effect of the Y-direction, first-order term of the optical path difference function being supposed to be constant, and, in addition, the reflecting diffraction angle at the second reflection-type volume hologram element becomes too small upon the effect of the Y-direction, first-order term of the optical path difference function being supposed to be constant. As a result, it becomes difficult to arrange the plurality of lenses, which form a relay optical system, to be substantially perpendicular to the light transmitting plate. Also, it becomes difficult to cause light to emerge from the light-transmitting plate in a direction substantially perpendicular to the light-transmitting plate. Therefore, it is difficult to lay out the observation optical system in "Π" shape along the face of the observer.

Also, if a value of (θ_S10/θ_S4) falls below the lower limit of Condition (7), the reflecting diffraction angle at the first reflection-type volume hologram element becomes too small upon the effect of the Y-direction, first-order term of the optical path difference function being supposed to be constant, and, in addition, the reflecting diffraction angle at the second reflection-type volume hologram element becomes too large upon the effect of the Y-direction, first-order term of the optical path difference function being supposed to be constant. As a result, it becomes difficult to arrange the plurality of lenses, which form a relay optical system, to be substantially perpendicular to the light transmitting plate. Also, it becomes difficult to cause light to emerge from the light-transmitting plate in a direction substantially perpendicular to the light-transmitting plate. Therefore, it is difficult to lay out the observation optical system in "Π" shape along the face of the observer.

Furthermore, it is desirable that the observation optical system according to the present invention satisfies the following condition (8) or (9):

$$0.8 < (OP1/OP2)/(H2\_S4/H2\_S10) < 3.0 \quad (8)$$

$$-3.5 < (\theta\_S10)/\theta\_S4) < -1.5 \quad (9)$$

Significance of the upper and lower limits of Conditions (8), (9) are similar to that of Conditions (6), (7).

Furthermore, it is desirable that the observation optical system according to the present invention satisfies the following condition (10) or (11):

$$1.0 < (OP1/OP2)/(H2\_S4/H2\_S10) < 2.0 \quad (10)$$

$$-2.5 < (\theta\_S10)/\theta\_S4) < -2.0 \quad (11)$$

Significance of the upper and lower limits of Conditions (10), (11) is similar to that of Conditions (6), (7).

Also, in the observation optical system according to the present invention, it is important to satisfy the following condition (12) for the purpose of achieving thin shape of the light-transmitting plate, which guides light using the phenomenon of total reflection:

$$0.1 < H2\_S4 < 2.8 \tag{12}$$

If a value of H2_S4 falls below the lower limit of Condition (12), the tilt angle of the second reflection-type volume hologram element is obliged to be too large, because otherwise bundles of rays reflected at the second reflection-type volume hologram element would cause total reflection inside the light-transmitting plate. Consequently, thickness of the light-transmitting plate becomes large, to result in bulkiness of the system.

On the other hand, if a value of H2_S4 exceeds the upper limit of Condition (12), the Y-direction, first-order term of the optical path difference function of the second reflection-type volume hologram element becomes too large. Accordingly, the pitch of the periodic structure of the reflection-type volume hologram to perform reflective diffraction becomes too small to allow fabrication.

Furthermore, it is desirable that the observation optical system according to the present invention satisfies the following condition (13):

$$0.3 < H2\_S4 < 1.4 \tag{13}$$

Significance of the upper and lower limits of Condition (13) is similar to that of Condition (12).

Furthermore, it is desirable that the observation optical system according to the present invention satisfies the following condition (14):

$$0.5 < H2\_S4 < 0.7 \tag{14}$$

Significance of the upper and lower limits of Condition (14) is similar to that of Condition (12).

Also, in a case where a reflecting surface having a power is decentered from the axial chief ray in the light-transmitting plate, it is preferred, in view of compensation for aberrations, that at least one surface out of surfaces constituting the plurality of lenses used in the present invention is a rotationally asymmetric surface.

In order to fold the path of rays along the face of the observer, it is necessary to arrange optical components such as a light-transmitting plate and a plurality of lenses as decentered. However, in a decentered optical system, decentered aberrations such as rotationally asymmetric distortion and rotationally asymmetric curvature of field are generated. Therefore, to compensate for these decentered aberrations, use of a rotationally asymmetric surface is preferred as described above.

By the similar reason, it is desirable that the surface of the hologram element used in the present invention also is a rotationally asymmetric surface.

The base surface on which the hologram element is provided may have planar shape or any other shape.

Also, a rotationally asymmetric surface used in the present invention may be configured as any one of an anamorphic surface, a toric surface, and a free curved surface that defines only one plane of symmetry. Specifically, the surface is preferably configured as a free curved surface that defines only one plane of symmetry.

Here, a free curved surface used in the present invention is defined by the following equation (15) where Z axis appearing therein is the axis of the free curved surface:

$$Z = cr^2 / \{1 + \sqrt{1 - (1+k)c^2r^2}\} + \sum_{j=2}^{66} c_j X^m Y^n \tag{15}$$

The first term of Equation (15) expresses the spherical component. The second term of Equation (15) expresses the free curve component. In the term of the spherical component, c represents a curvature at the vertex, k represents a conic constant, and $r = \sqrt{X^2 + Y^2}$.

The term of the free curve component is expanded as shown in the following equation (16):

$$\sum_{j=2}^{66} C_j X^m Y^n = C_2 X + C_3 Y + C_4 X^2 + C_5 XY + C_6 Y^2 + C_7 X^3 + \tag{16}$$
$$C_8 X^2 Y + C_9 XY^2 + C_{10} Y^3 + C_{11} X^4 + C_{12} X^3 Y + C_{13} X^2 Y^2 +$$
$$C_{14} XY^3 + C_{15} Y^4 + C_{16} X^5 + C_{17} X^4 Y + C_{18} X^3 Y^2 + C_{19} X^2 Y^3 +$$
$$C_{20} XY^4 + C_{21} Y^5 + C_{22} X^6 + C_{23} X^5 Y + C_{24} X^4 Y^2 + C_{25} X^3 Y^3 +$$
$$C_{26} X^2 Y^4 + C_{27} XY^5 + C_{28} Y^6 + C_{29} X^7 + C_{30} X^6 Y + C_{31} X^5 Y^2 +$$
$$C_{32} X^4 Y^3 + C_{33} X^3 Y^4 + C_{34} X^2 Y^5 + C_{35} XY^6 + C_{36} Y^7 \ldots$$

where $C_j$ (j is integer equal to or greater than 2) is a coefficient.

In general, a free curved surface as expressed above does not have a plane of symmetry along X-Z plane or along Y-Z plane. However, according to the present invention, upon all terms with odd-numbered powers of X being nullified, the free curved surface can define only one plane of symmetry that is parallel to Y-Z plane. Such a free curved surface is obtained, for example, by setting values of the coefficients $C_2$, $C_5$, $C_7$, $C_9$, $C_{12}$, $C_{14}$, $C_{16}$, $C_{18}$, $C_{20}$, $C_{23}$, $C_{25}$, $C_{27}$, $C_{29}$, $C_{31}$, $C_{33}$, $C_{35}$ . . . of the terms in Equation (15) at zero.

Alternatively, upon all terms with odd-numbered powers of Y being nullified, the free curved surface can define only one plane of symmetry that is parallel to X-Z plane. Such a free curved surface is obtained, for example, by setting values of the coefficients $C_3$, $C_5$, $C_8$, $C_{10}$, $C_{12}$, $C_{14}$, $C_{17}$, $C_{19}$, $C_{21}$, $C_{23}$, $C_{25}$, $C_{27}$, $C_{30}$, $C_{32}$, $C_{34}$, $C_{36}$ . . . of the terms in Equation (15) at zero.

Also, a free curved surface that defines one of the above-mentioned planes of symmetry is arranged so that its plane of symmetry corresponds to the decentering direction of the optical system. That is, a free curved surface defining a plane of symmetry parallel to Y-Z plane is combined with an optical system having decentering direction along Y axis, and a free curved surface defining a plane of symmetry parallel to X-Z plane is combined with an optical system having decentering direction along X axis, to effectively compensate for rotationally asymmetric aberrations caused by decentering and to improve facility for fabrication.

Equation (15) is presented as one example that can define a free curved surface. The present invention is characteristic in compensating for rotationally asymmetric aberrations resulting from decentering and improving facility for fabrication by using a rotationally asymmetric surface that defines only one plane of symmetry. Even if the free curved surface of the present invention is defined by any different expression other than Equation (15), it still has a similar effect, as a matter of course.

According to the present invention, any of reflecting surfaces provided in the light-transmitting plate and surfaces of the plurality of lenses may be shaped as a plane-symmetric free curved surface defining only one plane of symmetry.

Configuration of an anamorphic surface is defined by the following equation (17). The normal to the optical surface at the origin of the surface shape is defined as the axis of the anamorphic surface.

$$Z=(C_x \cdot X^2+C_y \cdot Y^2)/[1+\{1-(1+K_x)C_x^2 \cdot X^2-(1+K_y)C_y^2 \cdot Y^2\}^{1/2}]+\Sigma R_n\{(1-P_n)X^2+(1+P_n)Y^2\}^{(n+1)} \quad (17)$$

Here, if it is assumed that n is from 1 to 4 (polynomial of degree 4), for example, Equation (17) is expanded as the following expression (18):

$$Z = (C_x \cdot X^2 + C_y \cdot Y^2)/ \quad (18)$$
$$\left[1+\{1-(1+K_x)C_x^2 \cdot X^2-(1+K_y)C_y^2 \cdot Y^2\}^{1/2}\right]+$$
$$R_1\{(1-P_1)X^2+(1+P_1)Y^2\}^2+$$
$$R_2\{(1-P_2)X^2+(1+P_2)Y^2\}^3+$$
$$R_3\{(1-P_3)X^2+(1+P_3)Y^2\}^4+R_4\{(1-P_4)X^2+(1+P_4)Y^2\}^5$$

where Z is an amount of deviation from a plane tangent to the origin of the surface shape, $C_x$ is a curvature in X-axis direction, $C_y$ is a curvature in Y-axis direction, $K_x$ is a conical coefficient in X-axis direction, $K_y$ is a conical coefficient in Y-axis direction, $R_n$ is a rotationally symmetric component of a spherical surface term, and $P_n$ is a rotationally asymmetric component of an aspherical surface term. A radius of curvature $R_x$ in X-axis direction and a radius of curvature $R_y$ in Y-axis direction are correlated with the curvatures $C_x$, and $C_y$, respectively, as follows:

$$R_x=1/C_x, R_y=1/C_y.$$

Regarding the toric surface, there are two kinds; i. e. X toric surface and Y toric surface, which are expressed by the following equations (19), (20), respectively. The normal to the optical surface at the origin of the surface shape is defined as the axis of the toric surface.

X toric surface is defined as follows:

$$F(X) = C_x \cdot X^2/\left[1+\{1-(1+K)C_x^2 \cdot X^2\}^{1/2}\right]+ \quad (19)$$
$$AX^4+BX^6+CX^8+DX^{10}\ldots$$
$$Z = F(X)+(1/2)C_y\{Y^2+Z^2-F(X)^2\}$$

Y toric surface is defined as follows:

$$F(Y) = C_y \cdot Y^2/\left[1+\{1-(1+K)C_y^2 \cdot Y^2\}^{1/2}\right]+ \quad (20)$$
$$AY^4+BY^6+CY^8+DY^{10}\ldots$$
$$Z = F(Y)+(1/2)C_x\{X^2+Z^2-F(Y)^2\}$$

where Z is an amount of deviation from a plane tangent to the origin of the surface shape, $C_x$ is a curvature in X-axis direction, $C_y$ is a curvature in Y-axis direction, K is a conical coefficient, and A, B, C, and D are aspherical coefficients. A radius of curvature $R_x$ in X-axis direction and a radius of curvature $R_y$ in Y-axis direction are correlated with the curvatures $C_x$, and $C_y$, respectively, as follows:

$$R_x=1/C_x, R_y=1/C_y.$$

A free curved surface can be defined by Zernike polynomial, also. The configuration of the surface is defined by the following equations (21). Z axis appearing in Equation (21) represents the axis of Zernike polynomial. The rotationally asymmetric surface is defined by height in Z axis, in terms of polar coordinate, in reference to X-Y plane.

$$X = R \times \cos(A) \quad (21)$$
$$Y = R \times \sin(A)$$
$$Z = D_2 + D_3 R\cos(A) + D_4 R\sin(A) + D_5 R^2\cos(2A) +$$
$$D_6(R^2-1) + D_7 R^2\sin(2A) + D_8 R^3\cos(3A) +$$
$$D_9(3R^3-2R)\cos(A) + D_{10}(3R^3-2R)\sin(A) +$$
$$D_{11}R^3\sin(3A) + D_{12}R^4\cos(4A) + D_{13}(4R^4-3R^2)\cos(2A) +$$
$$D_{14}(6R^4-6R^2+1) + D_{15}(4R^4-3R^2)\sin(2A) +$$
$$D_{16}R^4\sin(4A) + D_{17}R^5\cos(5A) + D_{18}(5R^5-4R^3)\cos(3A) +$$
$$D_{19}(10R^5-12R^3+3R)\cos(A) +$$
$$D_{20}(10R^5-12R^3+3R)\sin(A) + D_{21}(5R^5-4R^3)\sin(3A) +$$
$$D_{22}R^5\sin(5A) + D_{23}R^6\cos(6A) + D_{24}(6R^6-5R^4)\cos(4A) +$$
$$D_{25}(15R^6-20R^4+6R^2)\cos(2A) +$$
$$D_{26}(20R^6-30R^4+12R^2-1) +$$
$$D_{27}(15R^6-20R^4+6R^2)\sin(2A) +$$
$$D_{28}(6R^6-5R^4)\sin(4A) + D_{29}R^6\sin(6A) \ldots$$

where R is a distance from Z axis in X-Y plane, A is an azimuth about Z axis expressed by a rotation angle from Y axis, and $D_m$ (m is integer equal to or greater than 2) is a coefficient. It is noted that Equation (21) corresponds to a free curved surface that is symmetric in X direction.

Configuration of a rotationally asymmetric free curved surface can be defined by the following equation (22) also. Z axis in Equation (22) corresponds to the axis of the rotationally asymmetric surface.

$$Z = \sum_n \sum_m C_{nm} X^n Y^{n-m} \quad (22)$$

where $\Sigma_n$ is the sum where n is from 0 to k, and $\Sigma_m$ is the sum where m is from 0 to n.

For defining a plane-symmetric free curved surface (a rotationally asymmetric surface having only one plane of symmetry), Equation (22), which expresses a rotationally asymmetric surface, may be used upon all its terms with odd-numbered powers of X being nullified (by, for example, coefficients of the terms with odd-numbered powers of X set to zero) in the case where symmetry of the surface appears along X direction, or upon all its terms with odd-numbered powers of Y being nullified (by, for example, coefficients of the terms with odd-numbered powers of Y set to zero) in the case where symmetry of the surface appears along Y direction.

Configuration of a rotationally symmetric aspherical surface is defined by the following equation (23). Z axis appearing in Equation (23) represents the axis of the rotationally symmetric aspherical surface.

$$Z=(Y^2/R)/[1+\{1-P(Y^2/R^2)\}^{1/2}]+A_4 Y^4+A_6 Y^6+A_8 Y^8+A_{10} Y^{10} \quad (23)$$

where Y is a direction perpendicular to Z, R is a radius of paraxial curvature, P is a conical coefficient, and $A_4, A_6, A_8, A_{10}$ are aspherical coefficients.

Configuration of a free curved surface used in the embodiments of the present invention is expressed by means of Equation (15). However, even if Equation (21) or Equation

(22) is applied, it does not affect the function and effect of the invention, as a matter of course.

Also, in the optical system according to the present invention, it is preferred that the plate surfaces of the light-transmitting plate are shaped as plane surfaces. However, the plate surface may be shaped as curved surfaces.

Also, according to the present invention, if the plate surfaces of the light-transmitting plate are shaped as curved surfaces having a curvature in one direction, the entire observation optical system is allowed to be made compact upon rather following the curvature of the face of the observer.

Also, a volume hologram may be applied to a base surface or may be embedded in the base surface to coincide therewith.

Also, it is desirable that a surface included in the plurality of lenses and provided for compensation for decentered aberrations is shaped as a rotationally asymmetric surface such as a free curved surface so as to achieve an optical system with good quality regarding compensation for rotationally asymmetric distortion and telecentricity. However, the surface may be shaped as a rotationally symmetric surface such as a spherical surface, an aspherical surface, and an anamorphic surface.

In addition, in the observation optical system according to the present invention, it is preferred that the light-transmitting plate is processed with AR coating. This configuration prevents external light from reflection, to obtain a clear image.

Also, the observation optical system according to the present invention, a support member which supports the observation optical system on the head of the observer so as to hold the exit pupil of the observation optical system at the position of the eye of the observer, and a speaker member which provides a sound for the ear of the observer can constitute a head-mount-type image display apparatus.

In this case, the head-mount-type image display apparatus may be configured so that the support member supports an observation optical system for the right eye and an observation optical system for the left eye, and that the speaker member has a right-ear speaker member and a left-ear speaker member.

Also, in the head-mount-type image display apparatus, the speaker member may be constructed of an ear phone.

Now, description is made of the embodiments of the observation optical system according to the present invention.

The configuration parameters for each embodiment are listed later. In each embodiment, as shown in FIG. 1 for example, an axial chief ray 2 is defined as a ray travelling from the center (i. e. the rotation center of an eyeball of an observer) of an exit pupil 1 to the center of a LCD 5, which is provided as an image display element, via the light-transmitting plate 3 and the plurality of lenses 4. The optical axis, which is defined by the straight line portion of the axial chief ray 2 from the exit pupil 1 to the intersection with the exit pupil-side surface of the light-transmitting plate 3, is defined as Z axis. The axis that intersects Z axis at right angles and that extends in the longitudinal direction of the light-transmitting plate 3 is defined as Y axis. The axis that intersects X axis and Y axis at right angles is defined as X axis. The center of the exit pupil 1 is determined as the origin of this coordinate system. A direction of the axial chief ray 2 from the exit pupil 1 toward the LCD 5 is defined as a positive direction of Z axis. A direction of Y axis that is toward the LCD 5 is defined as a positive direction of Y axis.

A direction of X axis that forms a right-hand system along with Y axis and Z axis is defined as a positive direction of X axis.

In each embodiment, the light-transmitting plate 3 and the plurality of lenses 4 are decentered in Y-Z plane. Also, Y-Z plane is the only plane of symmetry of each rotationally asymmetric surface provided for the light-transmitting plate 3 and the plurality of lenses 4.

For each decentered surface, amount of displacement (expressed by X, Y, Z for components in X-axis direction, Y-axis direction, Z-axis direction, respectively) of the vertex position of the surface from the origin of the corresponding coordinate system and tilt angles ($\alpha$, $\beta$, $\gamma$ (°)) of the center axis (=Z axis in Equation (15) for a free curved surface) of the surface in reference to X axis, Y axis and Z axis, respectively, are given. A positive value of $\alpha$ or $\beta$ means counterclockwise rotation in reference to the positive direction of the corresponding axis, while a positive value of $\gamma$ means clockwise rotation in reference to the positive direction of Z axis. Other parameters such as radius of curvature of spherical surface, surface separation, refractive index of medium, and Abbe's number are given by the conventional method.

As discussed above, the configuration of the free curved surface used in the present invention is defined by Equation (15), where Z axis corresponds the axis of the free curved surface.

FIRST EMBODIMENT

The observation optical system according to the first embodiment as shown in FIG. 1 includes a LCD 5 as the image display element which displays an image to be observed by an observer, a relay optical system 6 which relays image information formed on the LCD 5, and an eyepiece optical system 7 which introduces the image information relayed by the relay optical system 6 into the eye of the observer. Also, an exit pupil 1 is formed on the pupil surface so as to allow observation of the image displayed on the LCD 5.

The relay optical system has a plurality of lenses 4 and a first reflection-type HOE 8. The eyepiece optical system 7 has a second reflection-type HOE 9. The first reflection-type HOE 8 and the second reflection-type HOE 9 are formed on the predetermined base surfaces $3_1$, $3_2$, respectively, in the light-transmitting plate 3.

The light-transmitting plate 3 is filled with a transparent medium and is constructed and arranged to lead bundles of rays, which are reflected at least by the first reflection-type HOE 8, to the second reflection-type HOE 9 by letting the bundles of rays cause, in the path of rays, total reflection five times inside the transparent medium at the interface, which excludes the base surfaces on which the hologram elements are provided, between a thin-plate section 3a and the outside.

In the description of each embodiment, surface arrangement numbers of the optical system are assigned in order from the exit pupil 1 through the LCD 5 (reverse ray tracing). Description of arrangement order of the surfaces in the light-transmitting plate and the plurality of lenses also conforms to the reverse ray tracing.

The plurality of lenses 4 are composed of free curved surface lenses. The light-transmitting plate 3 is provided with reflection-type HOEs 8, 9 formed on the base surfaces $3_1$, $3_2$, which are located on the far side surfaces from the observer in the entrance region and the exit region.

The first reflection-type HOE 8 arranged in the entrance region of the light-transmitting plate 3 is configured so that bundles of rays with a predetermined wavelength are reflected by diffraction there, to be incident on the interface of the light-transmitting plate 3 at an angle greater than the critical angle for total reflection.

The second reflection-type HOE 9 arranged in the exit region of the light-transmitting plate 3 is configured so that the bundles of rays that have caused total reflection are reflected by diffraction there and are incident on the interface of the light-transmitting plate 3 at an angle not greater than the critical angle for total reflection, to exit out of the light-transmitting plate 3 toward the exit pupil.

The plurality of lenses 4 are configured as a free curved surface lens system including at least one free curved surface for the purpose of compensating for decentered aberrations generated through the light-transmitting plate 3 and chromatic aberrations caused via the HOEs.

Also, in the observation optical system according to the present invention, the bundles of rays emergent from the LCD 5 and transmitted through the plurality of free curved surface lenses 4 enter the light-transmitting plate 3 upon being incident on the entrance region at an incident angle not greater than the critical angle, to be incident on the first reflection-type HOE 8 at a first incident angle.

The first reflection-type HOE 8 is configured to have an angular selectivity to reflect by diffraction bundles of rays incident thereon at the first incident angle, and reflects the incident rays by diffraction. The bundles of rays reflected by diffraction at the first reflection-type HOE 8 are incident on the interface of the light-transmitting plate 3 at an angle greater than the critical angle. The light-transmitting plate lets the bundles of rays incident thereon at the incident angle greater than the critical angle cause total reflection. In this manner, the bundles of rays repeat, on the glass or plastic interfaces on both sides of the light-transmitting plate 3, incidence at an incident angle greater than the critical angle and total reflection five times, while being once formed as an image at a predetermined position (in FIG. 1, the position where the fourth total reflection occurs), and are introduced to the second reflection-type HOE 9 provided in the exit region.

The second reflection-type HOE 9 is configured to have an angular selectivity to reflect by diffraction bundles of rays incident thereon at a second incident angle, and reflects the incident rays by diffraction. The bundles of rays reflected by diffraction at the second reflection-type HOE 9 are incident on the interface of the light-transmitting plate 3 at an angle not greater than the critical angle, to exit out of the light-transmitting plate 3 toward the exit pupil 1.

In addition, a volume hologram is constructed of reflected by diffraction at the second reflection-type HOE 9 arranged in the exit region, and exit out of the exit region, to be imaged at the exit pupil 1.

Also, each of the volume holograms is constructed of three layers for R, G and B, so that a color image can be observed.

Also, the plate surfaces of the light-transmitting plate 3 are shaped to be planar along the longitudinal direction. Also, the light-transmitting plate 3 is constructed so that the base surface $3_1$ is sandwiched between transparent members on both sides, so as to allow an observer to observe a see-through image together with an image from the LCD 5 under the condition where the exit pupil 1 coincides with the eye.

Also, in the light-transmitting plate, the base surface $3_1$ is shape as a plane surface and the base surface $3_2$ is shaped as a spherical surface.

According to this embodiment, LEDs for the respective RGB colors are used as light sources. The LEDs for RGB colors have center wavelengths of 630 nm, 525 nm, 465 nm, respectively, with a broad emission spectrum as much as ±20 nm width. The Bragg's condition for the reflection-type volume hologram element according to the present invention is set at 632 nm, 520 nm, 465 nm, which are the center wavelengths of RGB colors in the color reproduction process. Also, under the condition where the reflection-type volume hologram element has the center refractive index n of 1.52 and the refractive index modulation rate Δn of 0.05, the bandwidth of each RGB color is limited substantially to ±8 nm because of the wavelength selectivity of the reflection-type volume hologram element. Regarding the optical specs, the focal length is 17.3 mm, the eye relief is 25 mm, the pupil diameter φ is 3 mm, the diagonal length of the image display element is 0.24 in. (3.658 mm (height)× 4.877 mm (width)), the resolution is QVGA, the observation field angle is 12° (horizontal)×16° (vertical), and the center diopter is −1.0D.

The numerical data of the first embodiment is shown below. In the data, "FFS" indicates free curved surface. This symbol is commonly used in the embodiments of the present invention.

Figure 2:
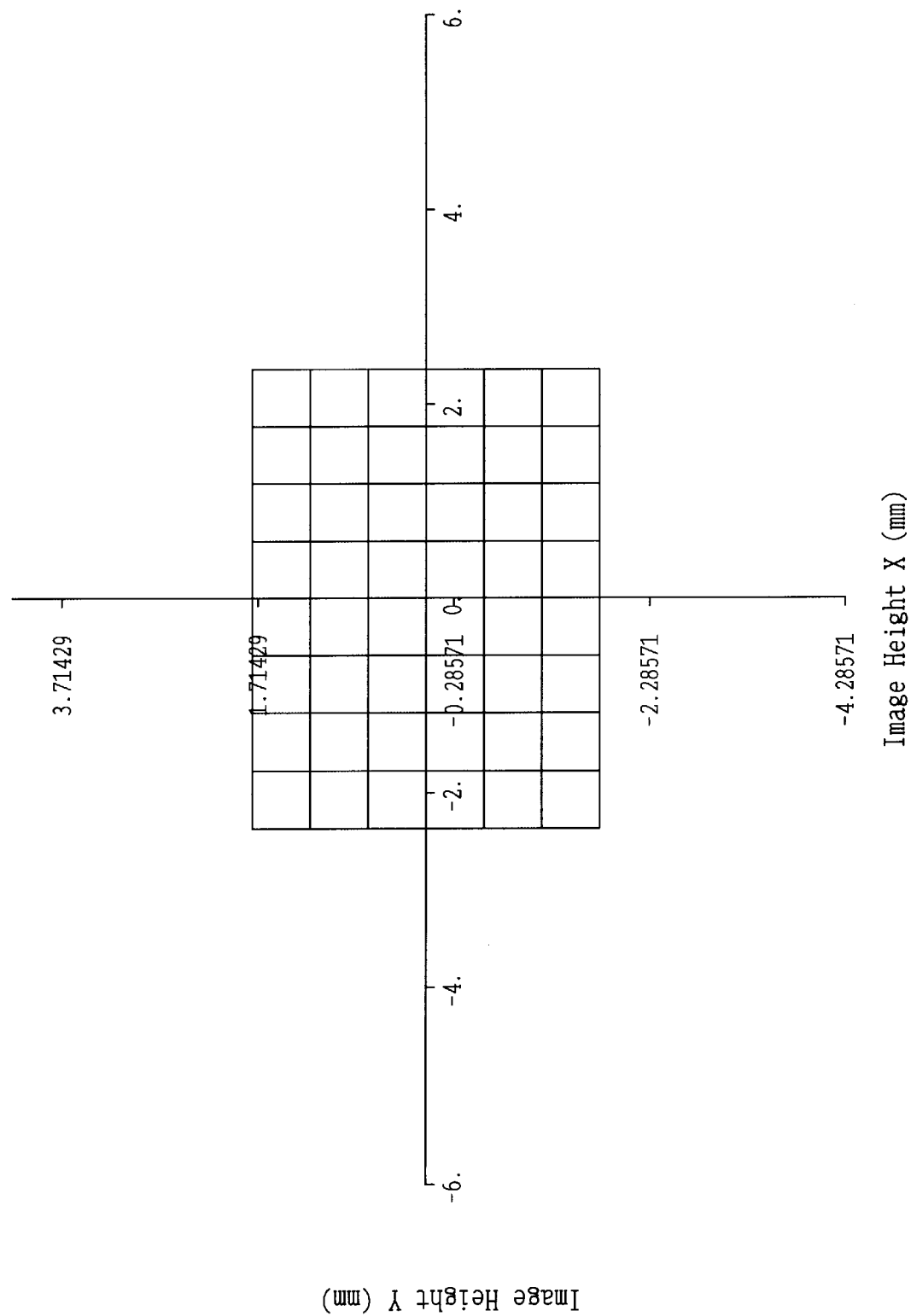
FIG. 2 is an aberration diagram showing the image distortion of the first embodiment.
Figure 3:
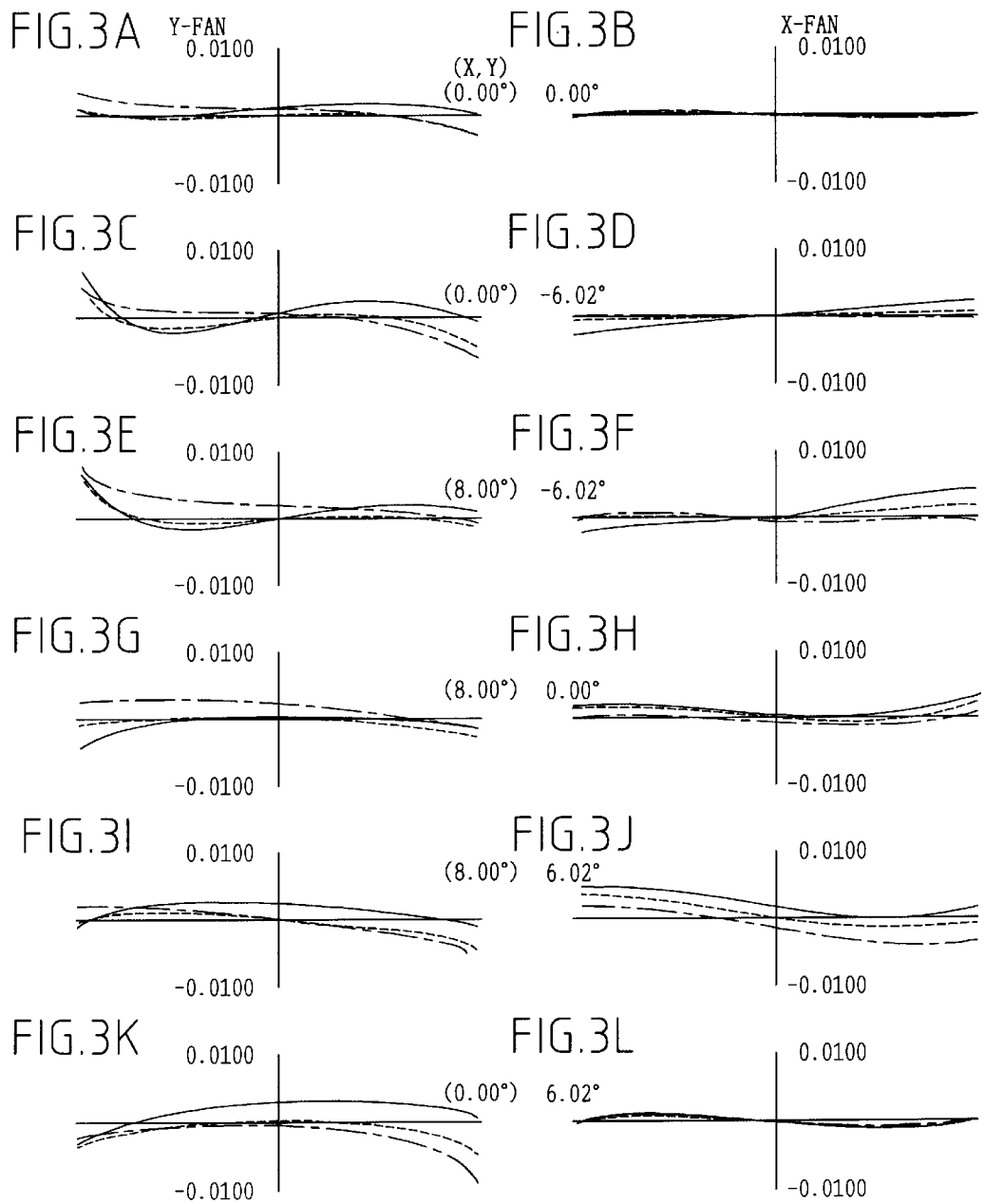
FIGS. 3A–3L are aberration diagrams showing the lateral aberrations in R band (red band) of the first embodiment.
Figure 4:
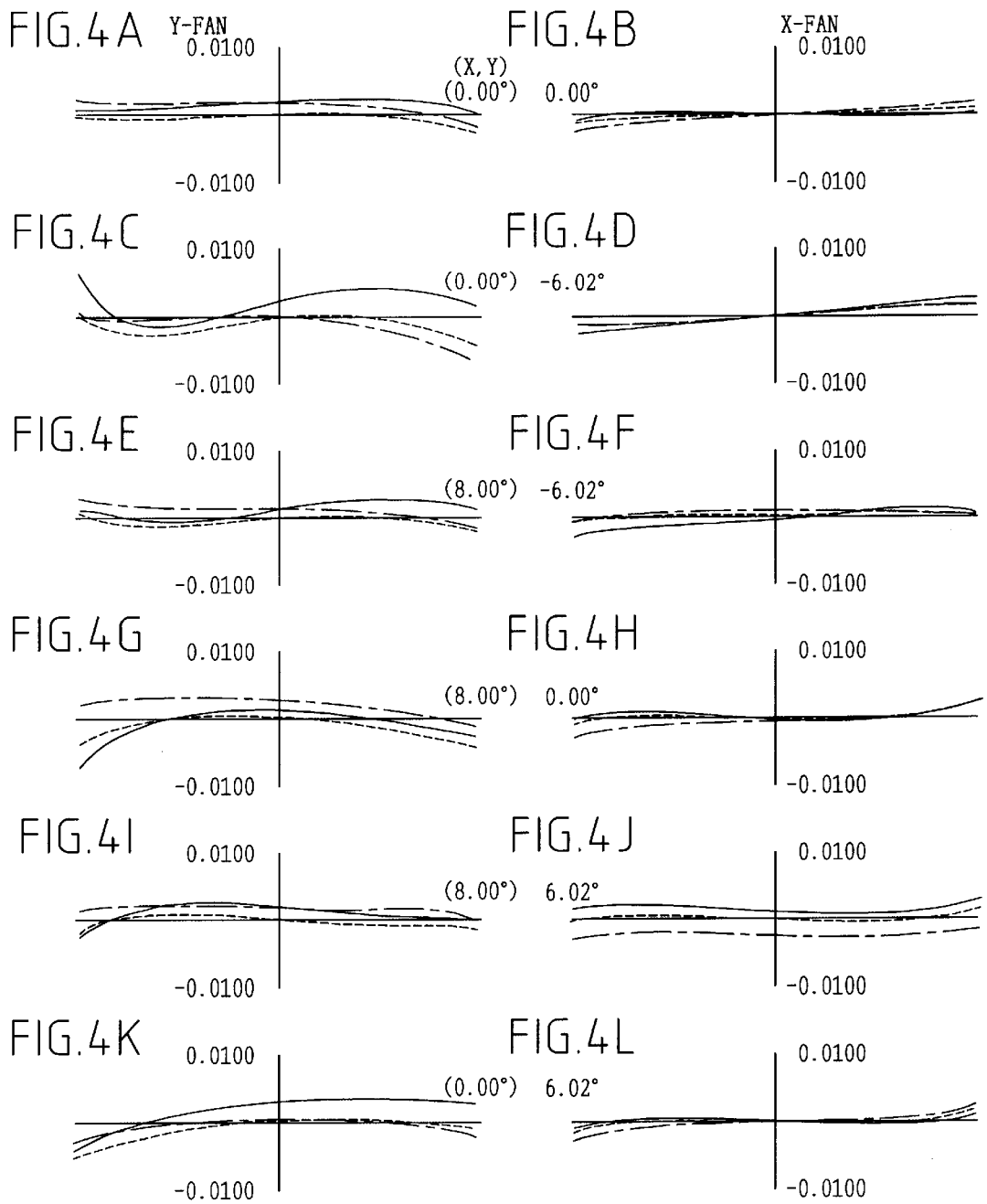
FIGS. 4A–4L are aberration diagrams showing the lateral aberrations in G band (green band) of the first embodiment.
Figure 5:
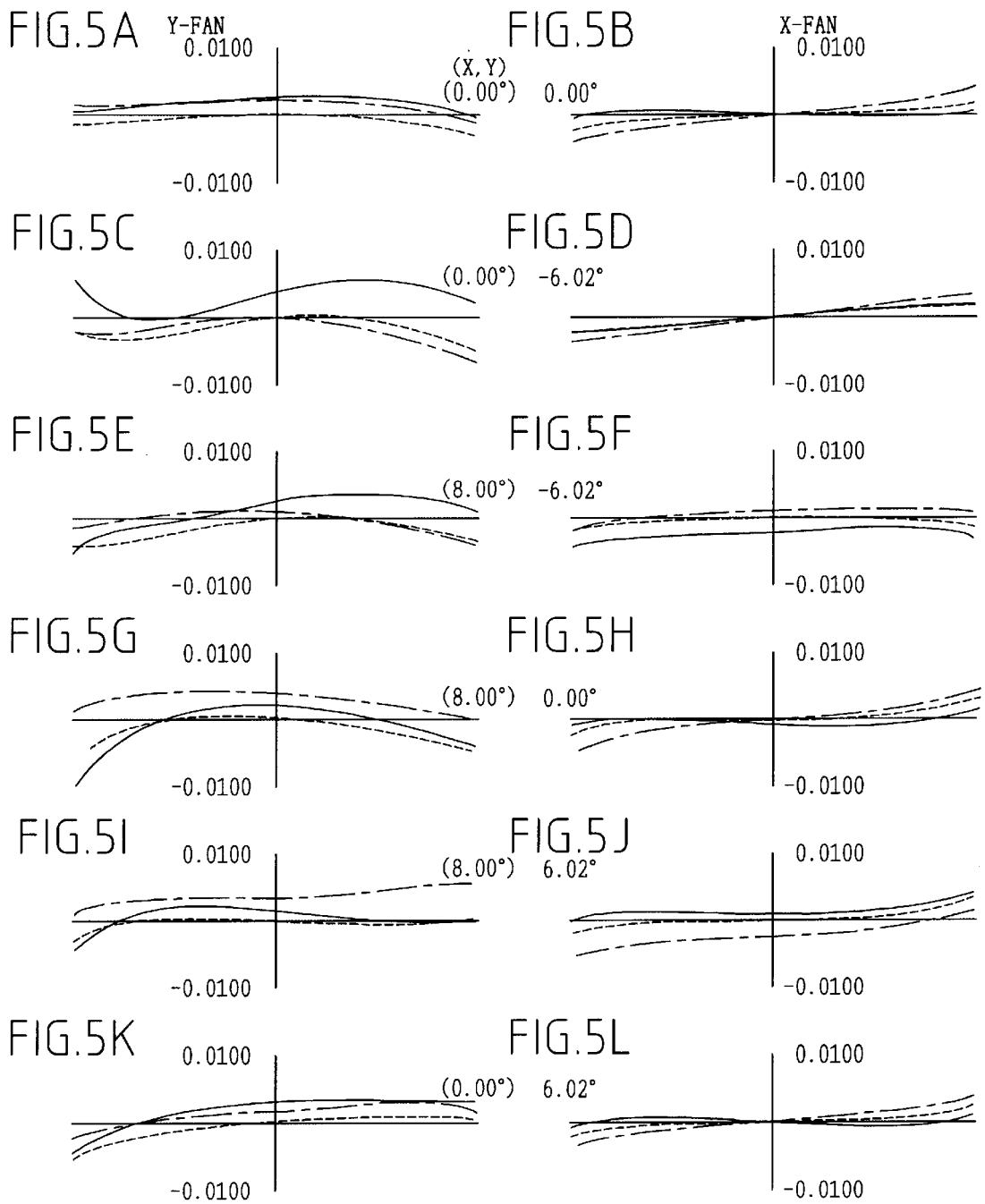
FIGS. 5A–5L are aberration diagrams showing the lateral aberrations in B band (blue band) of the first embodiment.

Also, in FIG. 2, which is an aberration diagram presenting the image distortion of the first embodiment, the ordinate represents image height in X direction, and the abscissa represents image height in Y direction. Also, out of FIGS. 3A–3L, FIGS. 4A–4L and FIGS. 5A–5L, which show lateral aberrations in the wavelength regions of R, G and B, respectively, each with suffix "A" shows a lateral aberration in Y direction of a chief ray that traverses a point where field angle in X direction is zero and field angle in Y direction is zero; each with suffix "B" shows lateral aberration in X direction of the chief ray that traverses the point where field angle in X direction is zero and field angle in Y direction is zero; each with suffix "C" shows lateral aberration in Y direction of a chief ray that traverses a point where field angle in X direction is zero and field angle in Y negative direction is maximum; each with suffix "D" shows lateral aberration in X direction of the chief ray that traverses the point where field angle in X direction is zero and field angle in Y negative direction is maximum; each with suffix "E" shows lateral aberration in Y direction of a chief ray that traverses a point where field angle in X positive direction is maximum and field angle in Y negative direction is maximum; each with suffix "F" shows lateral aberration in X direction of the chief ray that traverses the point where field angle in X positive direction is maximum and field angle in Y negative direction is maximum; each with suffix "G" shows lateral aberration in Y direction of a chief ray that traverses a point where field angle in X positive direction is maximum and field angle in Y direction is zero; each with suffix "H" shows lateral aberration in X direction of the chief ray that traverses the point where field angle in X positive direction is maximum and field angle in Y direction is zero; each with suffix "I" shows lateral aberration in Y direction of a chief ray that traverses a point where field angle in X positive direction is maximum and field angle in Y positive direction is maximum; each with suffix "J" shows lateral aberration in X direction of the chief ray that traverses the point where field angle in X positive direction is maximum and field angle in Y positive direction is maximum; each with suffix "K" shows lateral aberration in Y direction of a chief ray that traverses a point where field angle in X direction is zero and field angle in Y positive direction is maximum; and each with suffix "L" shows lateral aberration in X direction of the chief ray that traverses the point where field angle in X direction is zero and field angle in Y positive direction is maximum.

Numerical Data 1 pupil diameter φ: 3 mm  
horizontal full field angle: 12.00°  
vertical full field angle: 16.00°

| Surface Arrange. Number | Radius of Curvature | Surface Separation | Decentering | Refractive Index | Abbe's Number | Hologram Surface |
|---|---|---|---|---|---|---|
| object surface | ∞ | −1000.00 | | | | |
| 1 | pupil surface | 0.00 | | | | |
| 2 | ∞ | 0.00 | decentering[1] | 1.4924 | 57.63 | |
| 3 | ∞ | reflecting surface | 0.00 decentering[2] | 1.4924 | 57.63 | HOE[1] |
| 4 | ∞ | reflecting surface | 0.00 decentering[1] | 1.4924 | 57.63 | |
| 5 | ∞ | reflecting surface | 0.00 decentering[3] | 1.4924 | 57.63 | |
| 6 | ∞ | reflecting surface | 0.00 decentering[1] | 1.4924 | 57.63 | |
| 7 | ∞ | reflecting surface | 0.00 decentering[3] | 1.4924 | 57.63 | |
| 8 | ∞ | reflecting surface | 0.00 decentering[1] | 1.4924 | 57.63 | |
| 9 | −112.40 | reflecting surface | 0.00 decentering[4] | 1.4924 | 57.63 | HOE[2] |
| 10 | ∞ | | 0.00 decentering[5] | | | |
| 11 | FFS[1] | | 0.00 decentering[6] | 1.4924 | 57.63 | |
| 12 | 45.16 | | 0.00 decentering[7] | | | |
| 13 | FFS[2] | | 0.00 decentering[8] | 1.4924 | 57.63 | |
| 14 | FFS[3] | | 0.00 decentering[9] | | | |
| 15 | FFS[4] | | 0.00 decentering[10] | 1.4924 | 57.63 | |
| 16 | FFS[5] | | 0.00 decentering[11] | | | |
| 17 | FFS[6] | | 0.00 decentering[12] | 1.4924 | 57.63 | |
| 18 | FFS[7] | | 0.00 decentering[13] | | | |
| display surface | ∞ | | 0.00 decentering[14] | | | |

FFS [1]:

$C_4 = -2.6950 \times 10^{-2}$  $C_6 = -2.7034 \times 10^{-2}$  $C_8 = 1.3455 \times 10^{-3}$  
$C_{10} = -5.4402 \times 10^{-4}$  $C_{11} = 1.3678 \times 10^{-4}$  $C_{13} = 1.3573 \times 10^{-4}$  
$C_{15} = -2.2333 \times 10^{-5}$

FFS [2]:

$C_4 = -1.6051 \times 10^{-2}$  $C_6 = -3.3193 \times 10^{-2}$  $C_8 = 1.1756 \times 10^{-2}$  
$C_{10} = 5.0749 \times 10^{-3}$  $C_{11} = -2.9810 \times 10^{-4}$  $C_{13} = -8.2528 \times 10^{-4}$  
$C_{15} = 5.2152 \times 10^{-4}$

FFS [3]:

$C_4 = 2.1998 \times 10^{-2}$  $C_6 = -6.8395 \times 10^{-2}$  $C_8 = 1.4086 \times 10^{-2}$  
$C_{10} = 7.3130 \times 10^{-4}$  $C_{11} = -4.0510 \times 10^{-4}$  $C_{13} = -2.6545 \times 10^{-3}$  
$C_{15} = -7.0596 \times 10^{-4}$

FFS [4]:

$C_4 = -1.3521 \times 10^{-2}$  $C_6 = 6.7987 \times 10^{-2}$  $C_8 = -4.7881 \times 10^{-3}$  
$C_{10} = 2.6046 \times 10^{-2}$  $C_{11} = -2.6721 \times 10^{-4}$  $C_{13} = -1.4772 \times 10^{-3}$  
$C_{15} = 4.9688 \times 10^{-4}$

FFS [5]:

$C_4 = -1.3987 \times 10^{-3}$  $C_6 = 1.6662 \times 10^{-2}$  $C_8 = -1.4737 \times 10^{-2}$  
$C_{10} = 1.0275 \times 10^{-2}$  $C_{11} = -6.1802 \times 10^{-4}$  $C_{13} = -6.9539 \times 10^{-5}$  
$C_{15} = -1.2307 \times 10^{-3}$

FFS [6]:

$C_4 = -2.0665 \times 10^{-2}$  $C_6 = -9.9028 \times 10^{-2}$  $C_8 = 3.7188 \times 10^{-3}$  
$C_{10} = -5.8403 \times 10^{-3}$  $C_{11} = -3.7474 \times 10^{-4}$  $C_{13} = -1.2791 \times 10^{-3}$  
$C_{15} = 1.8670 \times 10^{-4}$

FFS [7]:

$C_4 = -2.0224 \times 10^{-2}$  $C_6 = -3.8572 \times 10^{-2}$  $C_8 = -3.6494 \times 10^{-3}$  
$C_{10} = -3.8947 \times 10^{-3}$  $C_{11} = 5.3448 \times 10^{-4}$  $C_{13} = -7.6149 \times 10^{-4}$  
$C_{15} = 1.2216 \times 10^{-3}$ -continued

HOE [1]:

HV1 = REA                HV2 = REA                HOR = 1
HX1 = 0.0                HY1 = 0.0                HZ1 = 0.0
HX2 = 0.0                HY2 = 0.0                HZ2 = 0.0
HWL(1$^{st}$ layer) = 647 nm    HWL(2$^{nd}$ layer) = 532 nm    HWL(3$^{rd}$ layer) = 477 nm 1$^{st}$ layer:

$H_2 = 6.2248 \times 10^{-1}$    $H_3 = -2.4908 \times 10^{-2}$    $H_5 = -2.6122 \times 10^{-2}$
$H_7 = 1.1131 \times 10^{-3}$    $H_9 = 1.7682 \times 10^{-4}$ 2$_{nd}$ layer:

$H_2 = 6.2739 \times 10^{-1}$    $H_3 = -2.4911 \times 10^{-2}$    $H_5 = -2.6204 \times 10^{-2}$
$H_7 = 1.1260 \times 10^{-3}$    $H_9 = 1.8157 \times 10^{-4}$ 3$^{rd}$ layer:

$H_2 = 6.3370 \times 10^{-1}$    $H_3 = -2.4971 \times 10^{-2}$    $H_5 = -2.6319 \times 10^{-2}$
$H_7 = 1.1391 \times 10^{-3}$    $H_9 = 1.8452 \times 10^{-4}$

HOE [2]:

HV1 = REA                HV2 = REA                HOR = 1
HX1 = 0.0                HY1 = 0.00               HZ1 = 0.0
HX2 = 0.0                HY2 = 0.0                HZ2 = 0.0
HWL(1$^{st}$ layer) = 647 nm    HWL(2$^{nd}$ layer) = 532 nm    HWL(3$^{rd}$ layer) = 477 nm 1$^{st}$ layer:

$H_2 = 3.0656 \times 10^{-1}$    $H_3 = -8.5633 \times 10^{-3}$    $H_5 = -8.1830 \times 10^{-3}$
$H_7 = -4.5105 \times 10^{-4}$   $H_9 = 1.2576 \times 10^{-4}$ 2$^{nd}$ layer:

$H_2 = 3.0946 \times 10^{-1}$    $H_3 = -8.4324 = 10^{-3}$    $H_5 = -8.2096 \times 10^{-3}$
$H_7 = -4.6426 \times 10^{-4}$   $H_9 = 1.2744 \times 10^{-4}$ 3$^{rd}$ layer:

$H_2 = 3.1251 \times 10^{-1}$    $H_3 = -8.3598 \times 10^{-3}$    $H_5 = -8.2528 \times 10^{-3}$
$H_7 = -4.7492 \times 10^{-4}$   $H_9 = 1.2925 \times 10^{-4}$ Decentering [1]:

X = 0.0        Y = 0.0        Z = 25.0
α = 0.0        β = 0.0        γ = 0.0

Decentering [2]:

X = 0.0        Y = 0.0        Z = 26.7
α = −18.5      β = 0.0        γ = 0.0

Decentering [3]:

X = 0.0        Y = 0.0        Z = 28.4
α = 0.0        β = 0.0        γ = 0.0

Decentering [4]:

X = 0.0        Y = 44.98      Z = 30.50
α = 39.48      β = 0.00       γ = 0.00

Decentering [5]:

X = 0.0        Y = 44.98      Z = 25.0
α = 0.0        β = 0.00       γ = 0.0

Decentering [6]:

X = 0.0        Y = 44.98      Z = 15.0
α = 0.0        β = 0.0        γ = 0.0

Decentering [7]:

X = 0.0        Y = 44.98      Z = 11.0
α = 0.0        β = 0.0        γ = 0.0

Decentering [8]:

X = 0.0        Y = 44.98      Z = 4.0
α = 0.0        β = 0.0        γ = 0.0

Decentering [9]:

X = 0.0        Y = 44.98      Z = 1.0
α = 0.0        β = 0.0        γ = 0.0

Decentering [10]:

X = 0.0        Y = 44.98      Z = −1.0
α = 0.0        β = 0.0        γ = 0.0

-continued

Decentering [11]

| | | |
|---|---|---|
| X = 0.0 | Y = 44.98 | Z = −5.0 |
| α = 0.0 | β = 0.0 | γ = 0.0 |

Decentering [12]:

| | | |
|---|---|---|
| X = 0.0 | Y = 44.98 | Z = −7.0 |
| α = 0.0 | β = 0.0 | γ = 0.0 |

Decentering [13]:

| | | |
|---|---|---|
| X = 0.0 | Y = 44.98 | Z = −11.0 |
| α = 0.0 | β = 0.0 | γ = 0.0 |

Decentering [14]:

| | | |
|---|---|---|
| X = 0.0 | Y = 44.98 | Z = −16.56 |
| α = 0.0 | β = 0.0 | γ = 0.0 |

Conditions:

| hologram | parameter | R(632 nm) | G(520 nm) | B(465 nm) |
|---|---|---|---|---|
| first hologram (S10) | X-direction power (1/mm) | 0.0167 | 0.0173 | 0.0163 |
| | Y-direction power (1/mm) | 0.0160 | 0.0168 | 0.0161 |
| | Y-direction optical path difference function term H2_S10 | 0.3066 | 0.3095 | 0.3125 |
| | optical path difference (intermediate image - first hologram) OP1 (mm) | 55.6597 | 57.0038 | 56.2095 |
| | angle θ_S10 (degree) | | 39.483 | |
| | radius of curvature (mm) | | −112.4030 | |
| second hologram (S4) | X-direction power (1/mm) | 0.0487 | 0.0510 | 0.0487 |
| | Y-direction power (1/mm) | 0.0510 | 0.0536 | 0.0513 |
| | Y-direction optical path difference function term H2_S4 | 0.6225 | 0.6279 | 0.6337 |
| | optical path difference (second hologram - intermediate image) OP2 (mm) | 18.0885 | 17.1289 | 18.2128 |
| | angle θ_S4 (degree) | | −18.500 | |
| | radius of curvature (mm) | | plane surface | |
| conditions: | | | | |
| OP1/OP2 | | 3.0771 | 3.3279 | 3.0863 |
| H2_S4/H2_S10 | | 2.0303 | 2.0288 | 2.0278 |
| θ_S10/θ_S4 | | | −2.1342 | |
| (OP1/OP2)/(H2_S4/H2_S10) | | 1.5156 | 1.6404 | 1.5219 |

SECOND EMBODIMENT

Figure 6:
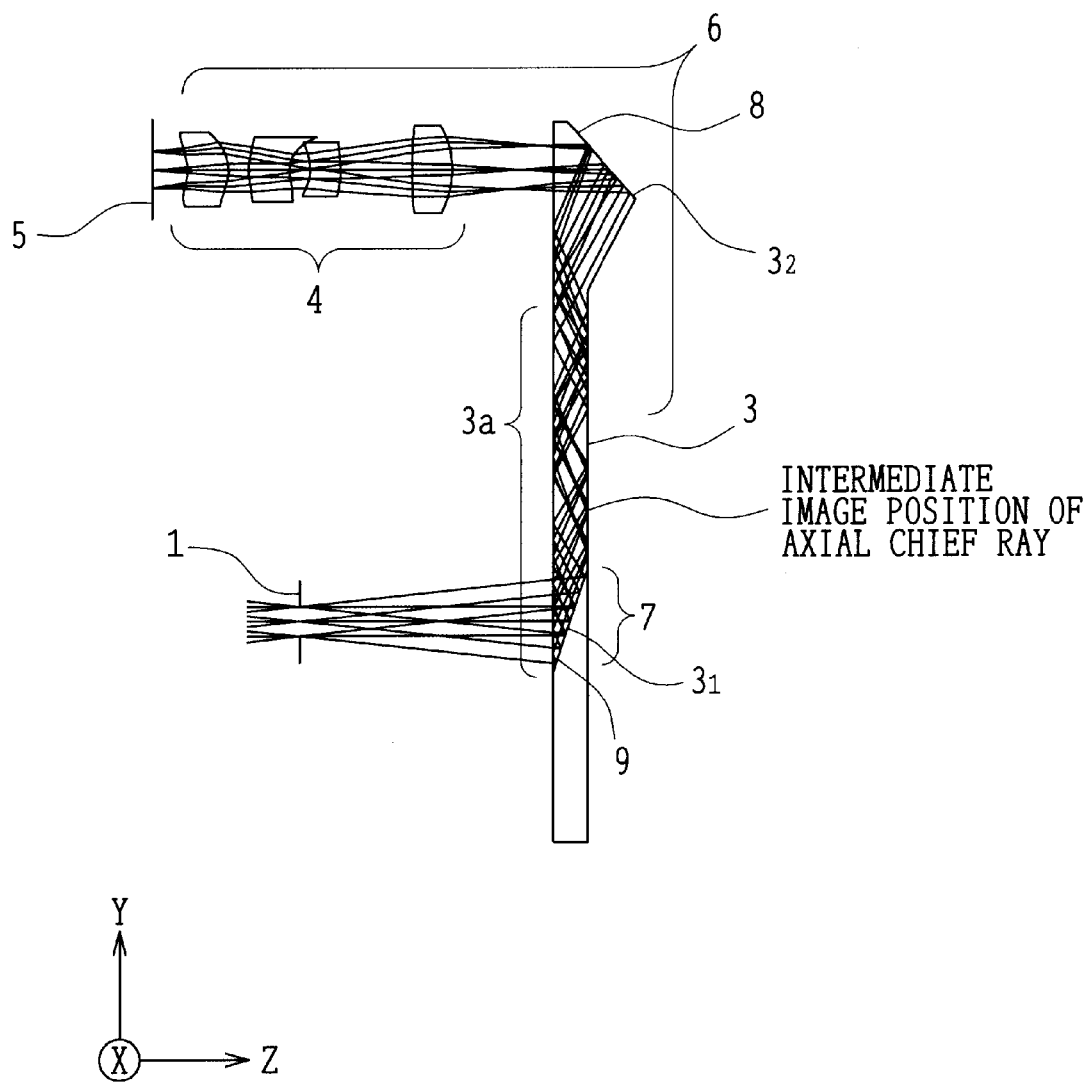
FIG. 6 is a sectional view of an observation optical system according to the second embodiment of the present invention taken along Y-Z plane in which the optical axis lies.

In the observation optical system according to the second embodiment shown in FIG. 6, the base surface $3_2$ of the light-transmitting plate 3 is shaped as a plane surface. The remaining basic configuration is substantially the same as the first embodiment.

Figure 7:
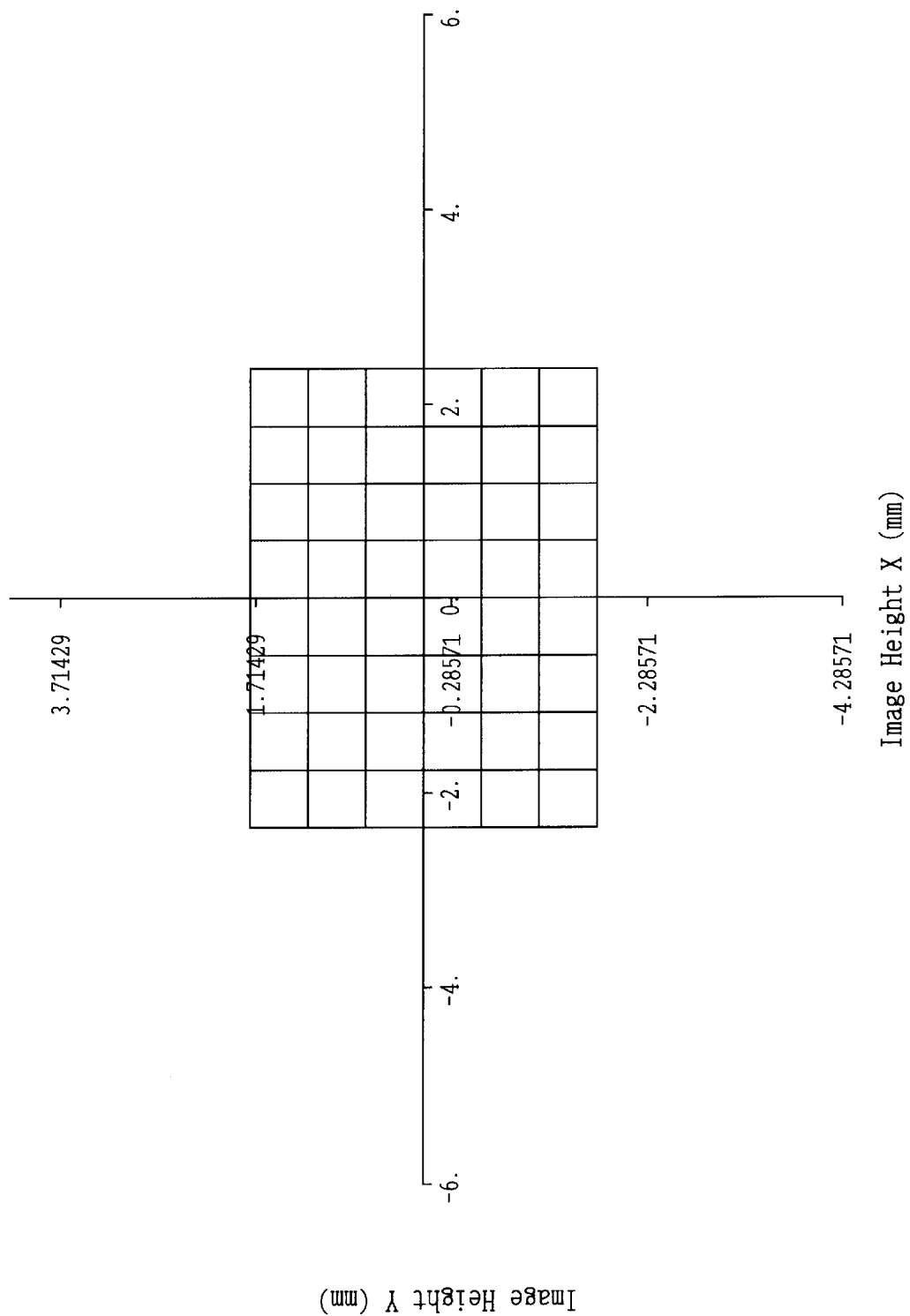
FIG. 7 is an aberration diagram showing the image distortion of the second embodiment.
Figure 8:
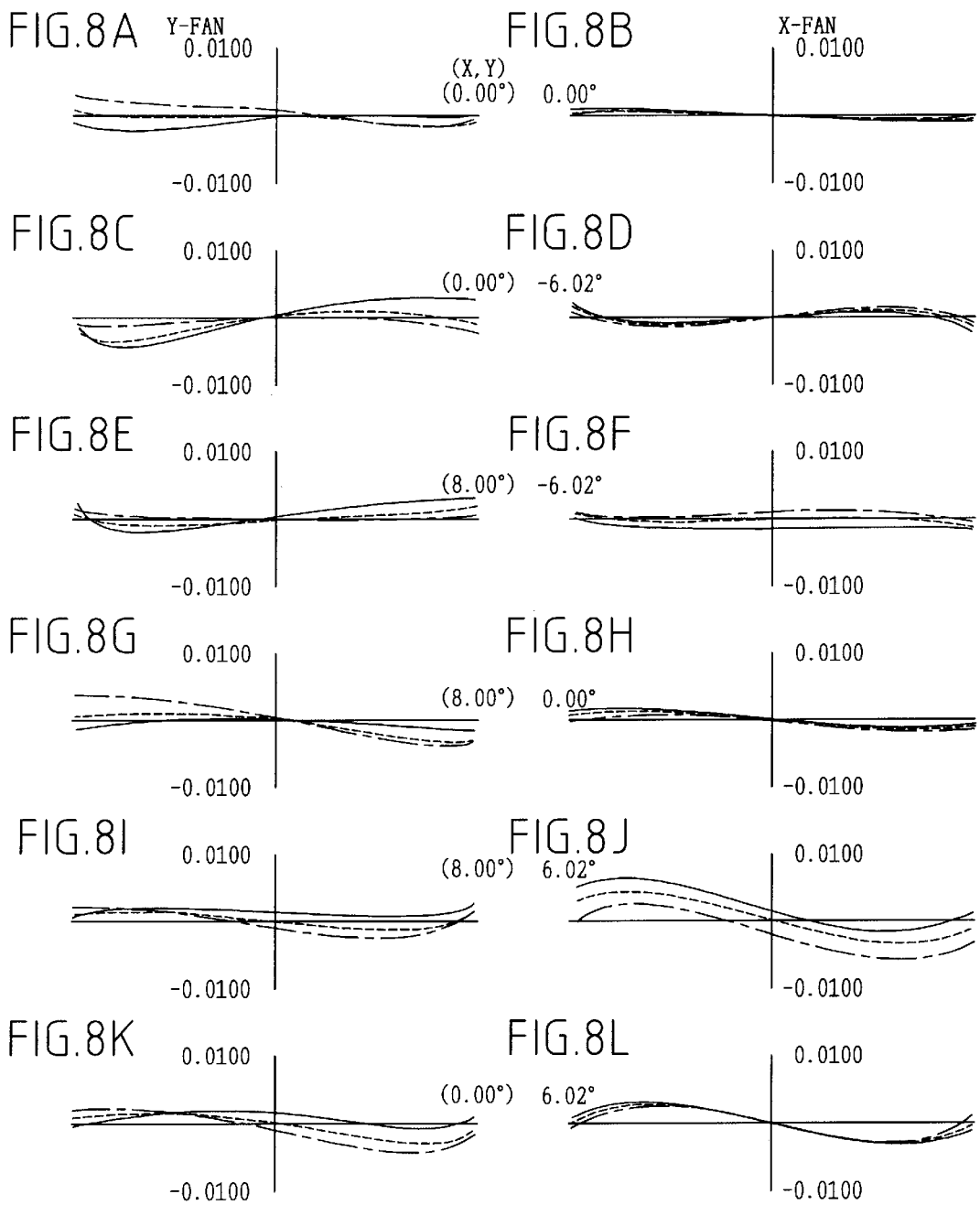
FIGS. 8A–8L are aberration diagrams showing the lateral aberrations in R band (red band) of the second embodiment.
Figure 9:
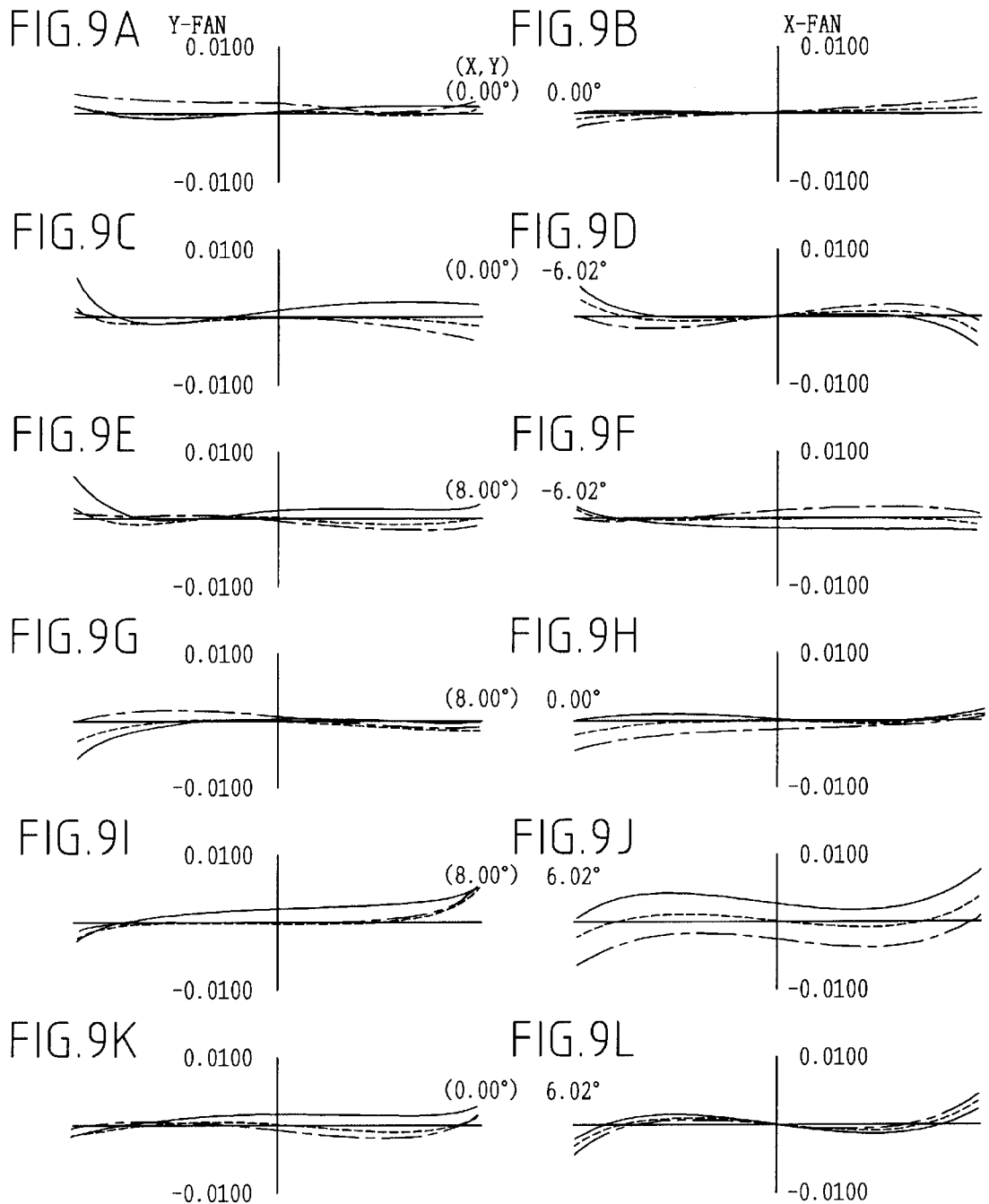
FIGS. 9A–9L are aberration diagrams showing the lateral aberrations in G band (green band) of the second embodiment.
Figure 10:
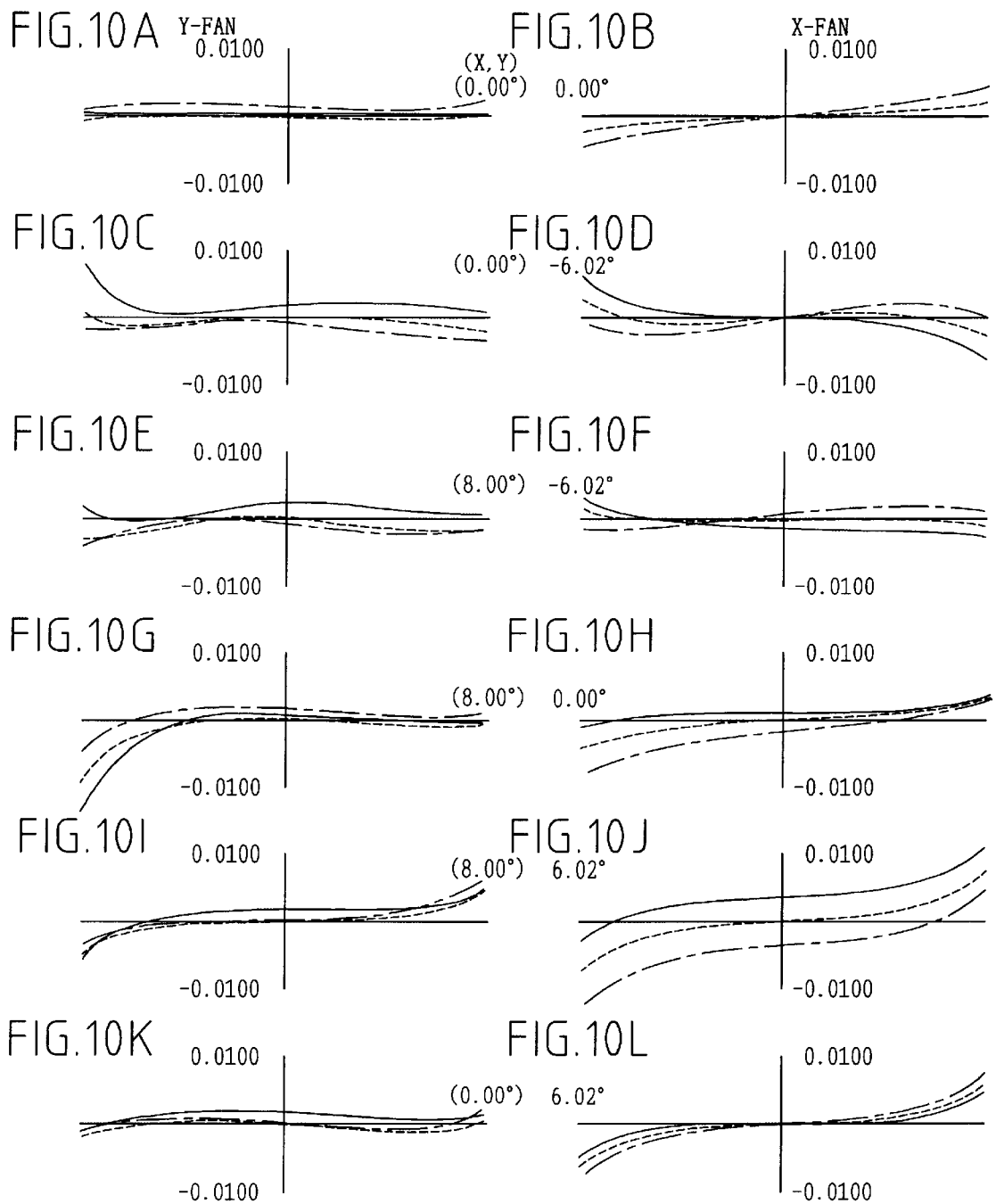
FIGS. 10A–10L are aberration diagrams showing the lateral aberrations in B band (blue band) of the second embodiment.

The numerical data of the second embodiment is shown below. Also, FIG. 7, which presents the image distortion of the second embodiment, is drawn in the same manner as FIG. 2. FIGS. 8A–8L, FIGS. 9A–9L and FIGS. 10A–10L, which show lateral aberrations in the wavelength regions of R, G and B, respectively, are drawn in the same manner as FIGS. 3A–3L, FIGS. 4A–4L and FIGS. 5A–5L.

Numerical Data 2 pupil diameter φ: 3 mm
horizontal full field angle: 12.00°
vertical full field angle: 16.00°

| Surface Number | Radius of Curvature | Surface Separation | Decentering | Refractive Index | Abbe's Number | Hologram Surface |
|---|---|---|---|---|---|---|
| object surface | ∞ | −1000.00 | | | | |
| 1 | pupil surface | 0.00 | | | | |
| 2 | ∞ | 0.00 | decentering[1] | 1.4924 | 57.63 | |
| 3 | ∞ | reflecting surface | 0.00 | decentering[2] | 1.4924 | 57.63 | HOE[1] |
| 4 | ∞ | reflecting surface | 0.00 | decentering[1] | 1.4924 | 57.63 | |
| 5 | ∞ | reflecting surface | 0.00 | decentering[3] | 1.4924 | 57.63 | |
| 6 | ∞ | reflecting surface | 0.00 | decentering[1] | 1.4924 | 57.63 | |
| 7 | ∞ | reflecting surface | 0.00 | decentering[3] | 1.4924 | 57.63 | |
| 8 | ∞ | reflecting surface | 0.00 | decentering[1] | 1.4924 | 57.63 | |
| 9 | ∞ | reflecting surface | 0.00 | decentering[4] | 1.4924 | 57.63 | HOE[2] |
| 10 | ∞ | | 0.00 | decentering[5] | | | |
| 11 | FFS[1] | | 0.00 | decentering[6] | 1.4924 | 57.63 | |
| 12 | 38.85 | | 0.00 | decentering[7] | | | |
| 13 | FFS[2] | | 0.00 | decentering[8] | 1.4924 | 57.63 | |
| 14 | FFS[3] | | 0.00 | decentering[9] | | | |
| 15 | FFS[4] | | 0.00 | decentering[10] | 1.4924 | 57.63 | |
| 16 | FFS[5] | | 0.00 | decentering[11] | | | |
| 17 | FFS[6] | | 0.00 | decentering[12] | 1.4924 | 57.63 | |
| 18 | FFS[7] | | 0.00 | decentering[13] | | | |
| display surface | ∞ | | 0.00 | decentering[14] | | | |

FFS [1]:

$C_4 = -5.1202 \times 10^{-2}$   $C_6 = -5.6911 \times 10^{-2}$   $C_8 = 1.3116 \times 10^{-4}$
$C_{10} = -6.5553 \times 10^{-4}$   $C_{11} = 1.9732 \times 10^{-5}$   $C_{13} = -8.1628 \times 10^{-5}$
$C_{15} = -7.9276 \times 10^{-5}$

FFS [2]:

$C_4 = -1.1864 \times 10^{-2}$   $C_6 = -5.0048 \times 10^{-2}$   $C_8 = 5.9605 \times 10^{-3}$
$C_{10} = 3.3190 \times 10^{-3}$   $C_{11} = 3.0830 \times 10^{-4}$   $C_{13} = 1.4860 \times 10^{-3}$
$C_{15} = 1.6245 \times 10^{-3}$

FFS [3]:

$C_4 = -1.5790 \times 10^{-2}$   $C_6 = -1.1124 \times 10^{-1}$   $C_8 = 1.5999 \times 10^{-2}$
$C_{10} = 4.1829 \times 10^{-3}$   $C_{11} = -2.7282 \times 10^{-5}$   $C_{13} = -9.1568 \times 10^{-4}$
$C_{15} = 2.0167 \times 10^{-3}$

FFS [4]:

$C_4 = -3.1787 \times 10^{-2}$   $C_6 = 1.1894 \times 10^{-1}$   $C_8 = 1.5076 \times 10^{-2}$
$C_{10} = 3.5602 \times 10^{-2}$   $C_{11} = -8.5791 \times 10^{-5}$   $C_{13} = 2.6056 \times 10^{-3}$
$C_{15} = 2.4045 \times 10^{-3}$

FFS [5]:

$C_4 = 3.6242 \times 10^{-2}$   $C_6 = 5.9672 \times 10^{-2}$   $C_8 = -1.9592 \times 10^{-2}$
$C_{10} = 3.0891 \times 10^{-3}$   $C_{11} = -2.9110 \times 10^{-4}$   $C_{13} = 3.6200 \times 10^{-3}$
$C_{15} = -1.4915 \times 10^{-3}$

FFS [6]:

$C_4 = 5.2497 \times 10^{-3}$   $C_6 = -1.1165 \times 10^{-1}$   $C_8 = -1.8261 \times 10^{-2}$
$C_{10} = -1.0622 \times 10^{-2}$   $C_{11} = -8.9012 \times 10^{-5}$   $C_{13} = 3.9192 \times 10^{-3}$
$C_{15} = 6.3659 \times 10^{-4}$

FFS [7]:

$C_4 = -3.1456 \times 10^{-2}$   $C_6 = -1.0610 \times 10^{-1}$   $C_8 = -2.0055 \times 10^{-2}$
$C_{10} = -4.5558 \times 10^{-3}$   $C_{11} = 1.0142 \times 10^{-1}$   $C_{13} = 4.2911 \times 10^{-3}$
$C_{15} = 5.2185 \times 10^{-3}$

HOE [1]:

HV1 = REA   HV2 = REA   HOR = 1
HX1 = 0.0   HY1 = 0.0   HZ1 = 0.0
HX2 = 0.0   HY2 = 0.0   HZ2 = 0.0
HWL(1st layer) = 647 nm   HWL(2nd layer) = 532 nm   HWL(3rd layer) = 477 nm -continued 1st layer:

$H_2 = 6.2852 \times 10^{-1}$    $H_3 = -2.3551 \times 10^{-2}$    $H_5 = -2.2755 \times 10^{-2}$
$H_7 = 8.3242 \times 10^{-4}$    $H_9 = 5.8355 \times 10^{-5}$ 2nd layer:

$H_2 = 6.2179 \times 10^{-1}$    $H_3 = -2.3134 \times 10^{-2}$    $H_5 = -2.2316 \times 10^{-2}$
$H_7 = 8.1140 \times 10^{-4}$    $H_9 = 5.6781 \times 10^{-5}$ 3rd layer:

$H_2 = 6.2840 \times 10^{-1}$    $H_3 = -2.3134 \times 10^{-2}$    $H_5 = -2.2316 \times 10^{-2}$
$H_7 = 8.0927 \times 10^{-4}$    $H_9 = 6.0759 \times 10^{-5}$

HOE [2]:

HV1 = REA            HV2 = REA            HOR = 1
HX1 = 0.0            HY1 = 0.0            HZ1 = 0.0
HX2 = 0.0            HY2 = 0.0            HZ2 = 0.0
HWL(1st layer) = 647 nm    HWL(2nd layer) = 532 nm    HWL(3rd layer) = 477 nm 1st layer:

$H_2 = 3.8429 \times 10^{-1}$    $H_3 = -1.1948 \times 10^{-2}$    $H_5 = -1.3274 \times 10^{-2}$
$H_7 = -1.4805 \times 10^{-4}$   $H_9 = 3.0172 \times 10^{-4}$ 2nd layer:

$H_2 = 3.8025 \times 10^{-1}$    $H_3 = -1.1370 \times 10^{-2}$    $H_5 = -1.2946 \times 10^{-2}$
$H_7 = -1.4221 \times 10^{-4}$   $H_9 = 3.0044 \times 10^{-4}$ 3rd layer:

$H_2 = 3.8448 \times 10^{-1}$    $H_3 = -1.1112 \times 10^{-2}$    $H_5 = -1.2923 \times 10^{-2}$
$H_7 = -1.4337 \times 10^{-4}$   $H_9 = 3.0507 \times 10^{-4}$ Decentering [1]:

X = 0.0              Y = 0.0              Z = 25.0
α = 0.0              β = 0.0              γ = 0.0

Decentering [2]:

X = 0.0              Y = 0.0              Z = 26.7
α = −18.5            β = 0.0              γ = 0.0

Decentering [3]:

X = 0.0              Y = 0.0              Z = 28.4
α = 0.0              β = 0.0              γ = 0.0

Decentering [4]:

X = 0.0              Y = 44.98            Z = 30.5
α = 41.15            β = 0.0              γ = 0.0

Decentering [5]:

X = 0.0              Y = 44.98            Z = 25.0
α = 0.0              β = 0.0              γ = 0.0

Decentering [6]:

X = 0.0              Y = 44.98            Z = 15.0
α = 0.0              β = 0.0              γ = 0.0

Decentering [7]:

X = 0.0              Y = 44.98            Z = 11.0
α = 0.0              β = 0.0              γ = 0.0

Decentering [8]:

X = 0.0              Y = 44.98            Z = 4.0
α = 0.0              β = 0.0              γ = 0.0

Decentering [9]:

X = 0.0              Y = 44.98            Z = 1.0
α = 0.0              β = 0.0              γ = 0.0

Decentering [10]:

X = 0.0              Y = 44.98            Z = −1.0
α = 0.0              β = 0.0              γ = 0.0

Decentering [11]:

X = 0.0              Y = 44.98            Z = −5.0
α = 0.0              β = 0.0              γ = 0.0

-continued

Decentering [12]:

| | | |
|---|---|---|
| X = 0.0 | Y = 44.98 | Z = −7.0 |
| α = 0.0 | β = 0.0 | γ = 0.0 |

Decentering [13]:

| | | |
|---|---|---|
| X = 0.0 | Y = 44.98 | Z = −11.0 |
| α = 0.0 | β = 0.0 | γ = 0.0 |

Decentering [14]:

| | | |
|---|---|---|
| X = 0.0 | Y = 44.98 | Z = −14.48 |
| α = 0.0 | β = 0.0 | γ = 0.0 |

Conditions:

| hologram | parameter | R(632 nm) | G(520 nm) | B(465 nm) |
|---|---|---|---|---|
| first hologram (S10) | X-direction power (1/mm) | 0.0233 | 0.0222 | 0.0217 |
| | Y-direction power (1/mm) | 0.0259 | 0.0253 | 0.0252 |
| | Y-direction optical path difference function term H2_S10 | 0.3343 | 0.3803 | 0.3845 |
| | optical path difference (intermediate image - first hologram) OP1 (mm) | 50.5897 | 51.8454 | 53.1477 |
| | angle θ_S10 (degree) | | 41.145 | |
| | radius of curvature (mm) | | plane surface | |
| second hologram (S4) | X-direction power (1/mm) | 0.0460 | 0.0452 | 0.0453 |
| | Y-direction power (1/mm) | 0.0445 | 0.0436 | 0.0437 |
| | Y-direction optical path difference function term H2_S4 | 0.6285 | 0.6218 | 0.6284 |
| | optical path difference (second hologram - intermediate image) OP2 (mm) | 23.0902 | 22.2727 | 21.2998 |
| | angle θ_S4 (degree) | | −18.500 | |
| | radius of curvature (mm) | | plane surface | |
| conditions: | | | | |
| | OP1/OP2 | 2.1910 | 2.3278 | 2.4952 |
| | H2_S4/H2_S10 | 1.6354 | 1.6350 | 1.6343 |
| | θ_S10/θ_S4 | | −2.2245 | |
| | (OP1/OP2)/(H2_S4/H2_S10) | 1.3397 | 1.4237 | 1.5268 |

THIRD EMBODIMENT

Figure 11:
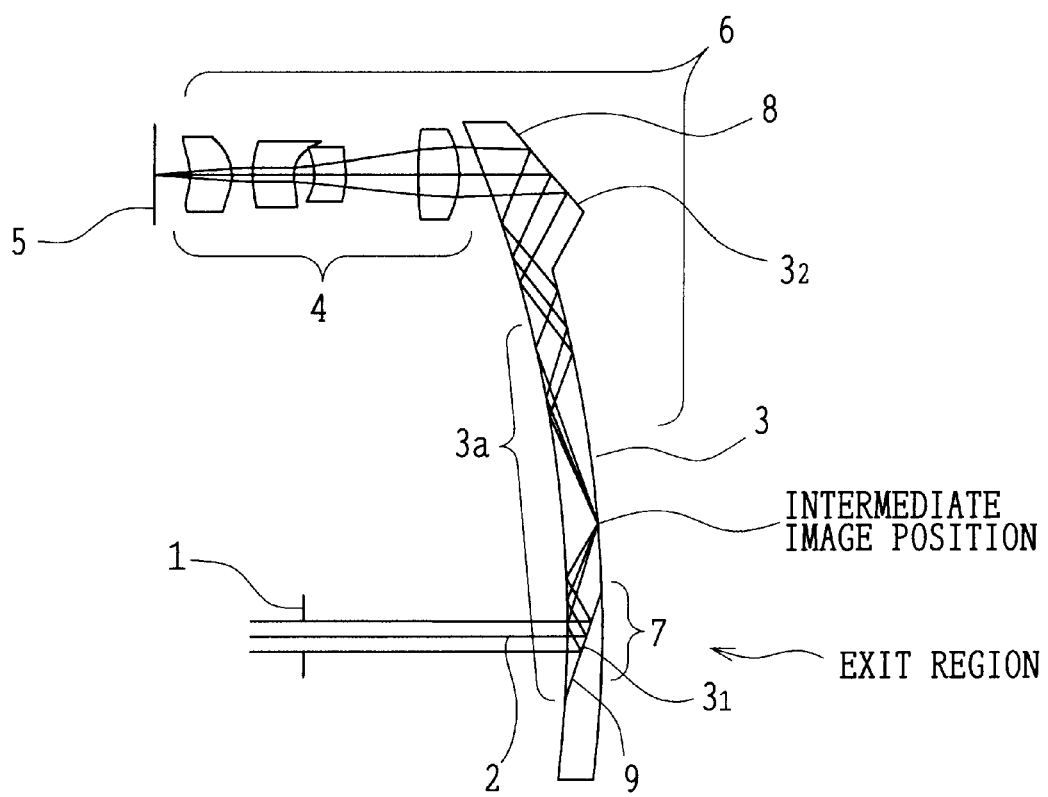
FIG. 11 is a sectional view of an observation optical system according to the third embodiment of the present invention taken along Y-Z plane in which the optical axis lies.

In the optical system according to the third embodiment shown in FIG. 11, the plate surfaces of the light-transmitting plate 3 are shaped to have a curvature along the face of an observer. The configuration of the first embodiment or the second embodiment is applied to the remaining basic configuration.

Next, description is made of application examples where the observation optical system according to the present invention is used in a head-mount-type image display apparatus.

Figure 12:
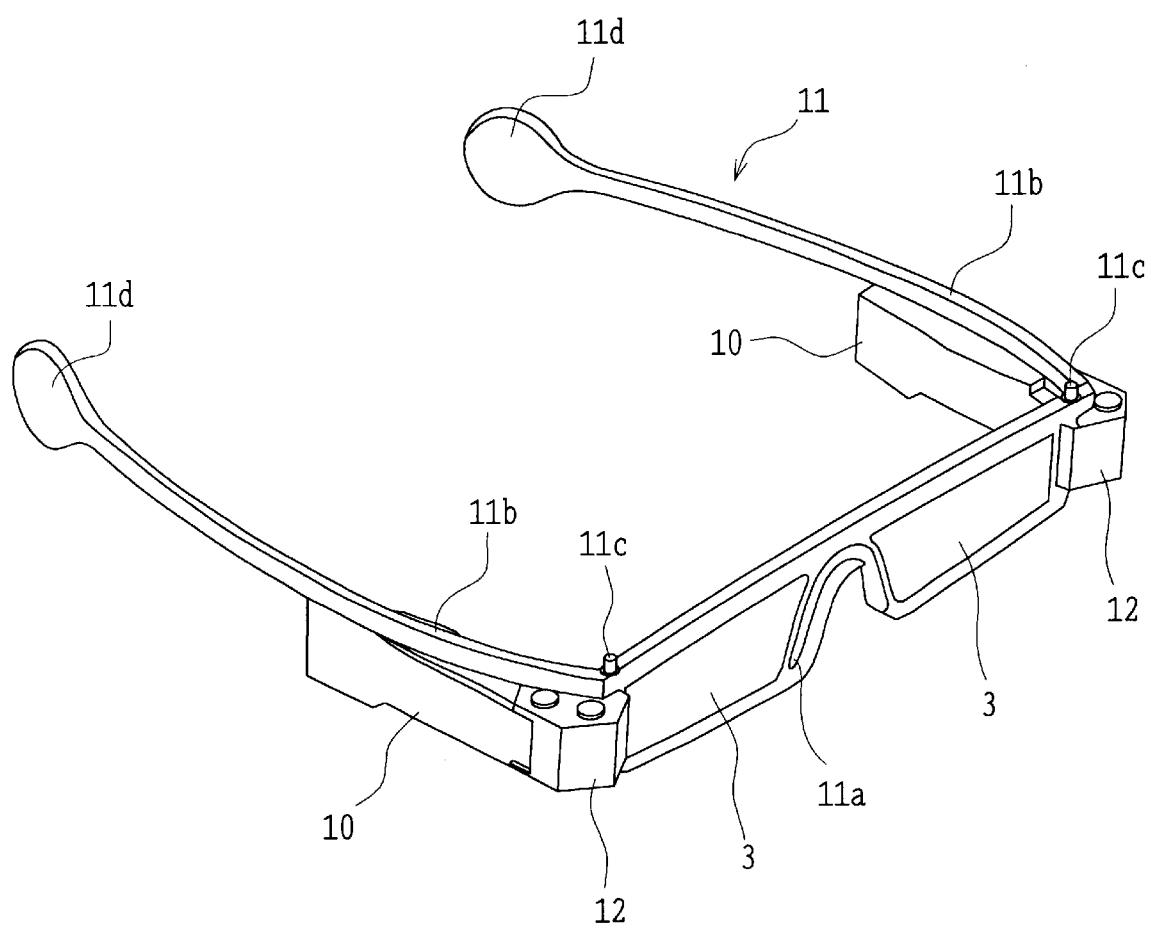
FIG. 12 is a perspective view of a head-mount-type image display apparatus using the observation optical system according to the present invention.

As shown in FIG. 12, a head-mount-type image display apparatus using the observation optical system according to the present invention is configured as a binocular image display apparatus having a pair of light-transmitting plates 3 for left and right eyes, a pair of cases 10 for left and right eyes, and a spectacle frame 11 which is held on the side heads of an observer. Each of the cases 10 holds therein an image display element 5 and a plurality of lenses as shown in FIG. 1 or FIG. 6. The light-transmitting plates 3 are set in a lens frame section 11a. Also, coupling members 12 are provided in the front regions of the left and right side sections 11b of the spectacle frame 11. The left and right coupling members 12 hinge the end portions of the cases 10 while securing fixed connection with the light-transmitting plates 3 by the entrance regions thereof, so that, on each of the left and right sides, the light-transmitting plate 3 is optically connectable with the image display element and the plurality of lenses in the case 10. Also, the spectacle frame 11 is constructed so that a front end 11c of each of the left and right side sections 11b hinges the lens frame section 11a. Also, the cases 10 are constructed to be foldable inwardly as the left and right side sections 11b of the spectacle frame 11 are, for convenience of storage.

The light-transmitting plate, the image display element and the plurality of lenses not shown in the Figure constitute an observation optical system as described in the first to third embodiments.

Also, in the spectacle frame 11, the rear end 11d of each of the left and right side sections 11b is shaped in such a manner that is can cover the ear or be hung on the ear, to achieve stable mount on the side heads of the observer.

Figure 13:
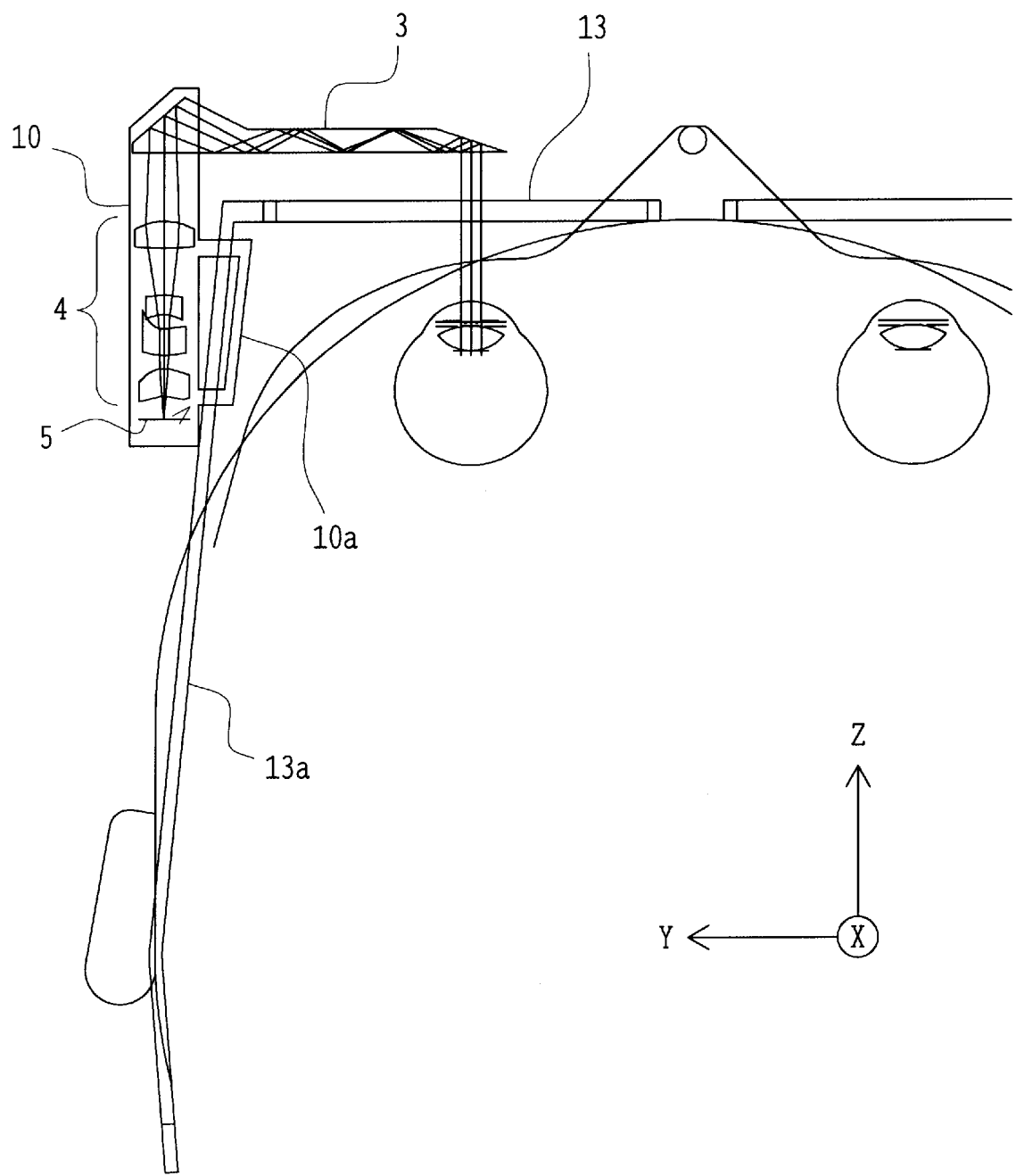
FIG. 13 is a schematic sectional view of a head-mount-type image display apparatus using the observation optical system according to the present invention, taken along Y-Z plane in which the optical axis lies.

In another head-mount-type image display apparatus using the observation optical system according to the present invention shown in FIG. 13, out of elements constituting the observation optical system, a LCD 5, a plurality of lenses 4 and the entrance region of a light-transmitting plate 3 are integrally fixed to a case 10, to form a monocular image display apparatus. The case 10 of the image display apparatus is provided with a clip portion 10a, via which the observation optical system achieves removable mount on the front region of the side head frame 13a of spectacles.

Figure 14:
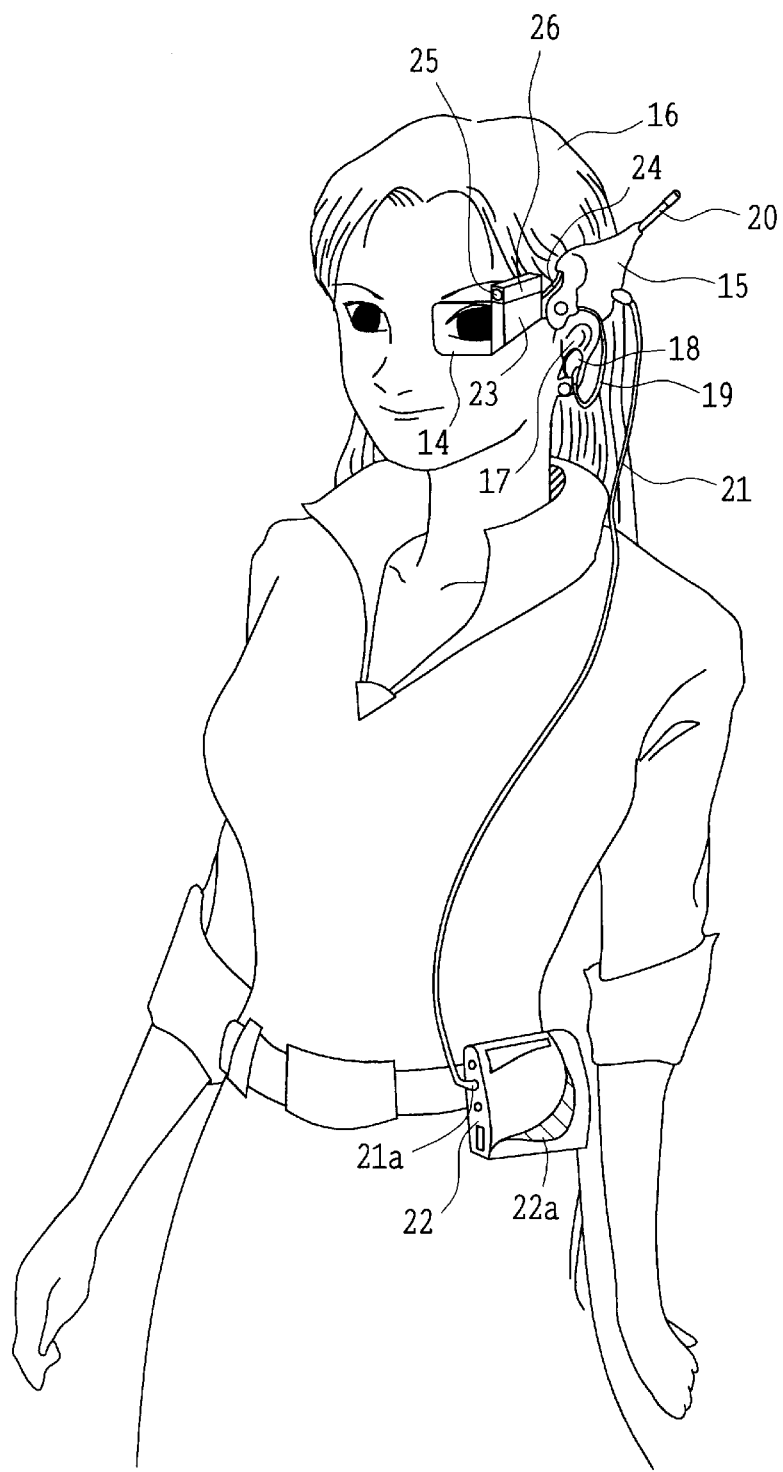
FIG. 14 is an explanatory view of a head-mount-type monocular image display apparatus using the observation optical system according to the present invention, as it is fit to the head of an observer.

FIG. 14 shows another head-mount-type monocular image display apparatus using the observation optical system according to the present invention, as it is worn by an observer (in the drawing, in front of the left eye). In FIG. 14, the reference numeral 14 represents a light-transmitting member (corresponding to the light-transmitting plate in each of the above-described embodiments) including a light-transmitting section made of glass or plastic and hologram elements which are applied to base surfaces arranged in the entrance region and the exit region of the light-transmitting section. The light-transmitting member 14 is held in front of the left eye of the observer 16 upon a support member (not shown) arranged below a display apparatus main frame 15 being fixed via an ear 17 and the back of the head of the observer 16. The configuration recited in Japanese Patent Application Preliminary Publication (KOKAI) No. Hei 10-257581 may be employed, for example, as the configuration of the support member not shown.

To be specific, in a configuration where the apparatus is supported only on the left ear of the observer 16, the support member provided below the display apparatus main frame 15 is constructed so that "support section, auxiliary support section" recited in JP KOKAI 10-257581 form a curvature around the base of the pinna of the left ear 17 of the observer 16 from the upper side to the lower side. In this case, an earphone section 18, which is a speaker, may be configured as a monaural type having only a left-ear earphone section connected with a cord 19 which carries audio signals from the display apparatus main frame 15. Alternatively, in addition to the left-ear earphone section, a right-ear earphone section may be connected with a long cord (not shown) extending from the display apparatus main frame 15, to form a stereophonic earphone system.

Also, in a configuration where the image display apparatus is supported on the left and right ears of the observer 16, the support member provided below the display apparatus main frame 15 is constructed so that "stopper member" or other structure to achieve adjustment of length is provided in addition to "support section, auxiliary support section", which form a curvature around the base of the pinna of each of the left and right ears of the observer 16 from the upper side to the lower side on both sides of "head band" recited in JP KOKAI No. 10-257581. This configuration allows adjustment in accordance with the size of the head and the position of each ear of the observer. In this case, it is desirable that the cords which are connected with the left and right stereophonic earphone sections are enclosed inside the head band, with only the portions close to the earphone sections being exposed.

Furthermore, a CPU circuit or the like is built in the display apparatus main frame 15 to allow internet connection and TV signal receiving. Also, an antenna 20 is provided for the purpose of transmitting/receiving these signals.

Furthermore, a cable 21 for carrying external video and audio signals extends from the display apparatus main frame 15 and is connected with a video player unit 22. In FIG. 14, the reference numeral 22a represents switches, volume control etc. of the video player unit 22. Also, the end portion 21a of the cable 21 may be formed as a jack, to be plugged in an existing video deck etc. In this case, the CPU circuit and the antenna 20, which allows internet connection and TV signal receiving, may be removed, to configure a low-price model, where the apparatus may be connected, using the jack, with a TV tuner for observation of TV programs or may be connected with a computer for receiving computer graphics or images from internet.

Also, an image forming unit section 23 having an image display element such as LCD and a plurality of lenses (not shown) housed therein and a frame section 24 which is position-adjustable in accordance with the size of the face of the observer are provided between the display apparatus main frame 15 and the light-transmitting member 14. A cord for electrically connecting a CPU circuit built in the display apparatus main frame 15 with the image display element such as LCD is enclosed in the frame section 24. Also, to achieve position-adjustable structure, the frame section 24 itself may be made of an elastic body or, alternatively, the joint portion between the frame section 24 and the display apparatus main frame 15 may be constructed of a gear so that the frame section 24 is extensible in reference to the display apparatus main frame 15.

Also, a camera including a lens 25 and a CCD 26 is provided on the upper side of the image forming unit section 23. The spectacle-type apparatus of this example is provided with both the functions of an image display apparatus and a camera.

Figure 15:
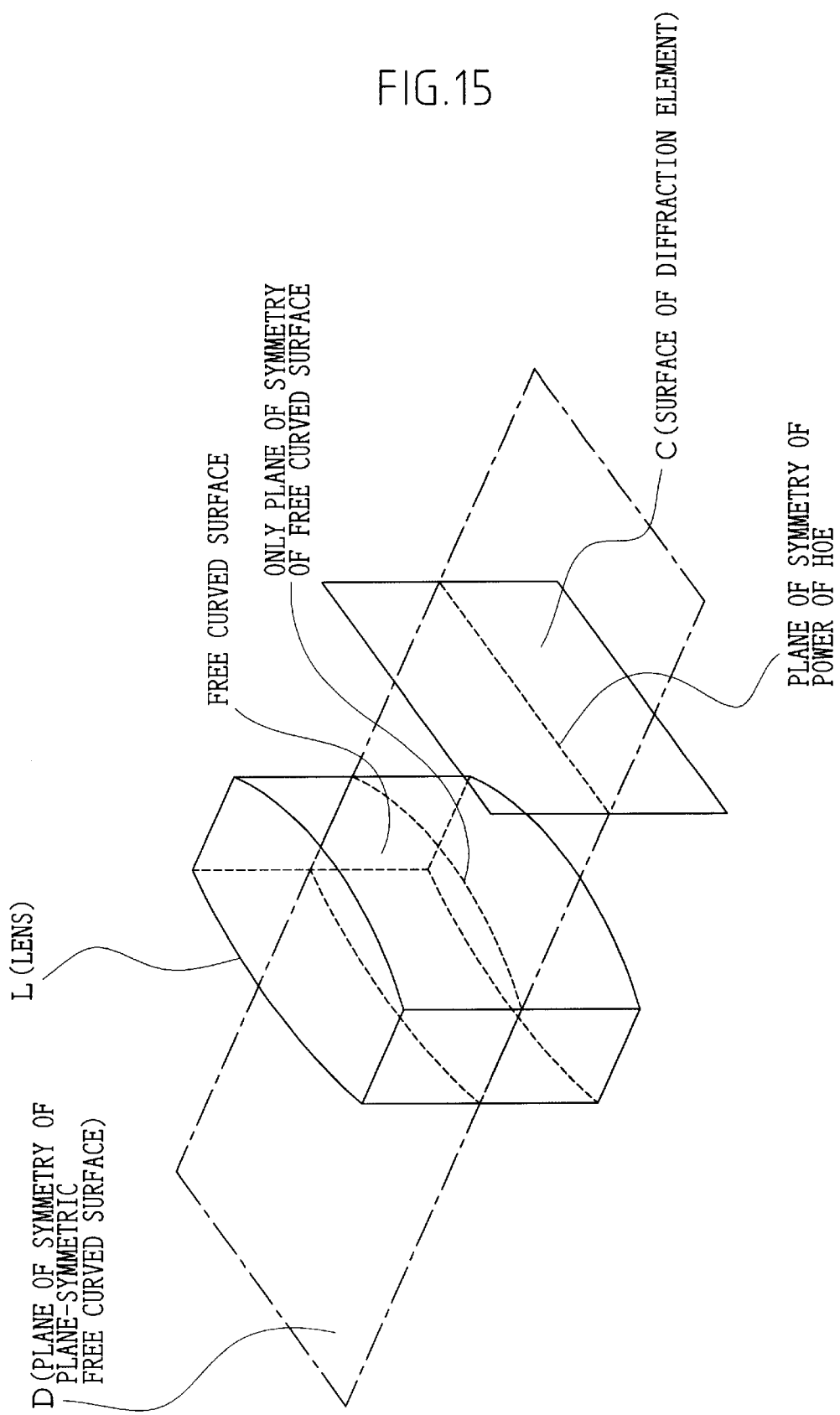
FIG. 15 shows a preferred configuration according to the present invention in the case where a diffraction element such as volume hologram is applied to a light-transmitting plate.

Next, a desirable arrangement in combining a diffraction element such as a volume hologram according to the present invention into a light-transmitting plate is shown in FIG. 15. In the drawing, the lens L corresponds to each lens of the plurality of lenses 4 included in the observation optical system according to the present invention. In the drawing, one lens alone is shown for explanation convenience. In the case where the surface C of the diffraction element is shaped quadrangular as shown in the drawing, and the first surface of the lens L is shaped as a plane-symmetric free curved surface, it is desirable, for beautiful image forming, to make arrangement so that the plane of symmetry D of the first surface of the lens L is parallel to at least one side of the quadrangular surface C of the diffraction element.

Furthermore, if the surface C of the diffraction element forms a regular square or a rectangle with all of its interior angles being substantially 90°, it is desirable to make arrangement so that the plane of symmetry D of the plane-symmetric free curved surface is parallel to two opposite sides of the surface C and that the plane of symmetry D coincides with the plane of symmetry of the surface C. Such an arrangement facilitates assembly accuracy and thus is effective for mass production.

Furthermore, if a plurality or all of optical surfaces constituting the plurality of lenses are plane-symmetric free curved surfaces, it is desirable, in view of design convenience and in aberration performance also, to make arrangement so that the planes of symmetry of the plurality or all of the plane symmetric surfaces are arranged on the common plane D. It is also desirable to satisfy the above-mentioned relationship between the plane of symmetry D and the power surface of the diffraction element.

As discussed above, the present invention is capable of providing an observation optical system that is so compact and lightweight as to be applicable to a head-mount-type virtual image observation apparatus, provides a bright image with high resolution, and is easily assembled.

What is claimed is:

1. An observation optical system comprising:
   an image display element;
   a relay optical system which relays image information formed on said image display element; and
   an eyepiece optical system which introduces the image information relayed by said relay optical system to an eyeball of an observer, wherein said relay optical system comprises, at least, a plurality of lenses and a first reflection-type volume hologram element, said first reflection-type volume hologram element being constructed and arranged to have a power and to compensate for chromatic aberrations, said plurality of lenses being constructed and arranged to compensate, at least, for decentered aberrations and chromatic aberrations, wherein said eyepiece optical system comprises a second reflection-type volume hologram element, which is constructed and arranged to reflect bundles of rays toward the eyeball of the observer, to exert a power on the bundles of rays, and to compensate for chromatic aberrations, wherein a light-transmitting plate is sandwiched between said first reflection-type volume hologram element and said second reflection-type volume hologram element, said light-transmitting plate being filled with a transparent medium and being constructed and arranged to introduce bundles of rays that are reflected at least by said first reflection-type volume hologram element to said second reflection-type volume hologram element by letting the bundles of rays cause, in the path of rays, total reflection odd-numbered times equal to or greater than three times, and wherein said light-transmitting plate allows said relay optical system and said image display element to be laid out along a face through a side head of the observer.

2. An observation optical system according to claim 1, wherein one of the following conditions is satisfied:

$$0.5 < (OP1/OP2)/H2\_S4/H2\_S10) < 4.0$$

$$-3.5 < (\theta\_S10)/\theta\_S4) < -1.0$$

where OP1 is an optical path length, in millimeters, measured along a chief ray in an axial field angle from an intermediate image to said first reflection-type volume hologram element, OP2 is an optical path length, in millimeters, measured along the chief ray in the axial field angle from said second reflection-type volume hologram element to the intermediate image, H2_S10 is a coefficient of a Y-direction, first-order component of an optical path difference function at said first reflection-type volume hologram element, H2_S4 is a coefficient of a Y-direction, first-order component of an optical path difference function at said second reflection-type volume hologram element, $\theta$_S10 is a tilt angle, in degrees, of said first reflection-type volume hologram element, and $\theta$_S4 is a tilt angle, in degrees, of said second reflection-type volume hologram element.

3. An observation optical system according to claim 1, wherein one of the following conditions is satisfied:

$$0.8 < (OP1/OP2)/H2\_S4/H2\_S10) < 3.0$$

$$-3.0 < (\theta\_S10)/\theta\_S4) < -1.5$$

where OP1 is an optical path length, in millimeters, measured along a chief ray in an axial field angle from an intermediate image to said first reflection-type volume hologram element, OP2 is an optical path length, in millimeters, measured along the chief ray in the axial field angle from said second reflection-type volume hologram element to the intermediate image, H2_S10 is a coefficient of a Y-direction, first-order component of an optical path difference function at said first reflection-type volume hologram element, H2_S4 is a coefficient of a Y-direction, first-order component of an optical path difference function at said second reflection-type volume hologram element, $\theta$_S10 is a tilt angle, in degrees, of said first reflection-type volume hologram element, and $\theta$_S4 is a tilt angle, in degrees, of said second reflection-type volume hologram element.

4. An observation optical system according to claim 1, wherein one of the following conditions is satisfied:

$$1.0 < (OP1/OP2)/H2\_S4/H2\_S10) < 2.0$$

$$-2.5 < (\theta\_S10)/\theta\_S4) < -2.0$$

where OP1 is an optical path length, in millimeters, measured along a chief ray in an axial field angle from an intermediate image to said first reflection-type volume hologram element, OP2 is an optical path length, in millimeters, measured along the chief ray in the axial field angle from said second reflection-type volume hologram element to the intermediate image, H2_S10 is a coefficient of a Y-direction, first-order component of an optical path difference function at said first reflection-type volume hologram element, H2_S4 is a coefficient of a Y-direction, first-order component of an optical path difference function at said second reflection-type volume hologram element, $\theta$_S10 is a tilt angle, in degrees, of said first reflection-type volume hologram element, and $\theta$_S4 is a tilt angle, in degrees, of said second reflection-type volume hologram element.

5. An observation optical system according to claim 1, wherein the following condition is satisfied:

$$0.1 < H2\_S4 < 2.8$$

where H2_S4 is a coefficient of a Y-direction, first-order component of an optical path difference function at said second reflection-type volume hologram element.

6. An observation optical system according to claim 1, wherein the following condition is satisfied:

$$0.3 < H2\_S4 < 1.4$$

where H2_S4 is a coefficient of a Y-direction, first-order component of an optical path difference function at said second reflection-type volume hologram element.

7. An observation optical system according to claim 1, wherein the following condition is satisfied:

$$0.5 < H2\_S4 < 0.7$$

where H2_S4 is a coefficient of a Y-direction, first-order component of an optical path difference function at said second reflection-type volume hologram element.

8. An observation optical system according to claim 1, wherein said light-transmitting plate is shaped to have a curvature along a face of the observer.

9. An observation optical system according to claim 1, wherein said light-transmitting plate is processed with AR coating.

10. An observation optical system according to claim 1, wherein surfaces of said light-transmitting plate are shaped as plane surfaces.

11. An observation optical system according to claim 1, wherein surfaces of said light-transmitting plate are shaped as curved surfaces.

12. An observation optical system according to claim 1, wherein said plurality of lenses have free curved surfaces, which are surfaces for compensating for decentered aberrations.

13. A head-mount-type image display apparatus comprising:
- a main frame in which an observation optical system recited in claim 1 is housed;
- a support member which supports said main frame on a head of an observer so as to hold an exit pupil of said observation optical system at a position of an eyeball of the observer; and
- a speaker member which provides a sound for an ear of the observer.

14. A head-mount-type image display apparatus comprising:
- a main frame in which a pair of observation optical systems each recited in claim 1 are housed for observation via a right eye and a left eye of an observer, respectively;
- a support member which supports said main frame on a head of the observer so as to hold exit pupils of said pair of observation optical systems at positions of eyeballs of the observer;
- a right-ear speaker member which provides a sound for a right ear of the observer; and
- a left-ear speaker member which provides a sound for a left ear of the observer.

15. A head-mount-type image display apparatus according to claim 13, wherein said speaker member is constructed of an earphone.

* * * * *

UNITED STATES PATENT AND TRADEMARK OFFICE
CERTIFICATE OF CORRECTION

PATENT NO. : 6,710,902 B2  
DATED : March 23, 2004  
INVENTOR(S) : Tetsuhide Takeyama It is certified that error appears in the above-identified patent and that said Letters Patent is hereby corrected as shown below:

<u>Title page,</u>  
Item [56], References Cited, FOREIGN PATENT DOCUMENTS, insert -- JP 10-257581      09/1998 --

Signed and Sealed this

Seventeenth Day of August, 2004

JON W. DUDAS  
*Acting Director of the United States Patent and Trademark Office*